US012716868B2

(12) United States Patent
Saito et al.

(10) Patent No.: US 12,716,868 B2
(45) Date of Patent: Aug. 25, 2026

(54) DETECTION DEVICE, DETECTION SYSTEM, AND PROPAGATING MEMBER

(71) Applicant: Kabushiki Kaisha Toshiba, Kawasaki (JP)

(72) Inventors: Masahiro Saito, Yokohama (JP); Hiromasa Takahashi, Minato (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 304 days.

(21) Appl. No.: 18/357,263

(22) Filed: Jul. 24, 2023

(65) Prior Publication Data

US 2024/0036006 A1 Feb. 1, 2024

(30) Foreign Application Priority Data

Jul. 29, 2022 (JP) ................................ 2022-122010

(51) Int. Cl.
*G01N 29/04* (2006.01)
*G01N 29/22* (2006.01)
*G01N 29/24* (2006.01)

(52) U.S. Cl.
CPC ........... *G01N 29/04* (2013.01); *G01N 29/043* (2013.01); *G01N 29/221* (2013.01);
(Continued)

(58) Field of Classification Search
CPC ...... G01N 29/04; G01N 29/043; G01N 29/22; G01N 29/221; G01N 29/225; G01N 29/24;
(Continued)

(56) References Cited

U.S. PATENT DOCUMENTS

2011/0000299 A1 1/2011 Isobe et al.
2011/0040185 A1 2/2011 Matsumura
(Continued)

FOREIGN PATENT DOCUMENTS

JP 02-132368 A 5/1990
JP 2-243137 A 9/1990
(Continued)

OTHER PUBLICATIONS

Japanese Office Action issued Feb. 12, 2026 in Japanese Patent Application No. 2022-122010 (with unedited computer-generated English Translation), 10 pages.

*Primary Examiner* — Benjamin R Schmitt
(74) *Attorney, Agent, or Firm* — Oblon, McClelland, Maier & Neustadt, L.L.P.

(57) ABSTRACT

A detection device is provided that includes a detector, a first propagating member, a second propagating member, and a fixture. The detector transmits an ultrasonic wave and detects a reflected wave. The first propagating member is mounted to the detector, and the ultrasonic wave propagates through the first propagating member. The second propagating member includes a second surface contacting a first surface of the first propagating member. The second surface includes a protrusion. The second propagating member is softer than the first propagating member. The ultrasonic wave propagates through the second propagating member after propagating through the first propagating member. The fixture presses a periphery of the second propagating member toward the first propagating member.

19 Claims, 30 Drawing Sheets

(52) U.S. Cl.
CPC ....... *G01N 29/225* (2013.01); *G01N 29/2462* (2013.01); *G01N 2291/0234* (2013.01); *G01N 2291/101* (2013.01); *G01N 2291/267* (2013.01)

(58) Field of Classification Search
CPC ........... G01N 29/2456; G01N 29/2462; G01N 2291/0234; G01N 2291/101; G01N 2291/267
See application file for complete search history.

(56) References Cited

U.S. PATENT DOCUMENTS

| | | | | |
|---|---|---|---|---|
| 2018/0238834 | A1* | 8/2018 | Sekiguchi | G01N 29/225 |
| 2019/0072526 | A1 | 3/2019 | Kitazawa et al. | |
| 2020/0035642 | A1 | 1/2020 | Egusa et al. | |

FOREIGN PATENT DOCUMENTS

| | | | |
|---|---|---|---|
| JP | 2008-259541 | A | 10/2008 |
| JP | 2009-36623 | A | 2/2009 |
| JP | 2009-204327 | A | 9/2009 |
| JP | 2012-002586 | A | 1/2012 |
| JP | 2013-154217 | A | 8/2013 |
| JP | 2018-110712 | A | 7/2018 |
| JP | 2019-45317 | A | 3/2019 |
| JP | 2022-117854 | A | 8/2022 |
| WO | WO 2018/143410 | A1 | 8/2018 |

* cited by examiner 11
10
S3
S3
13
O
S1
S2
12

11
S3
S3
13
O
S1
S2
12

11
S3
S3
13
Y
X
Z
S1
S2
12

P1
R1
P1
R1
12-4
12b
R2
P0
P2
P2
R2
B1
B2
Y
Z
X

P1
P2
R1
R1
S2
Y
X
Z
B1
B2
12b

P1
R1
P1
R1
P1
12-6
12b
P0
B1
B2
Y
Z
X

P1
P1
R1
R1
P0
S2
B1
B2
12b
Y
X
Z

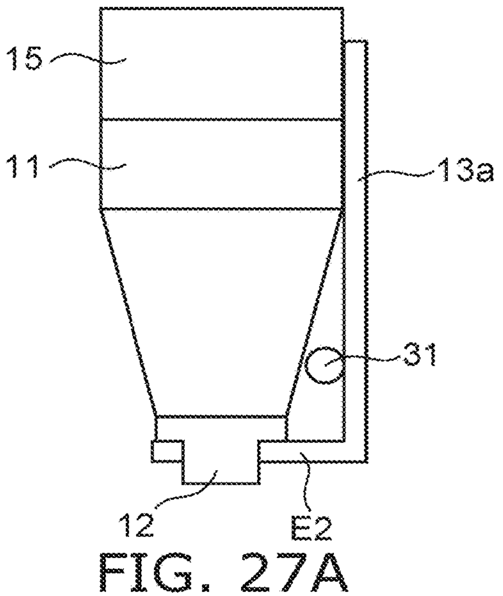
FIG. 27A
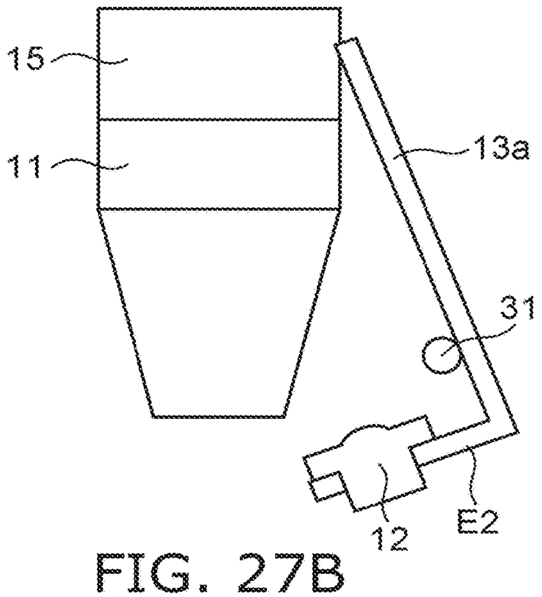
FIG. 27B
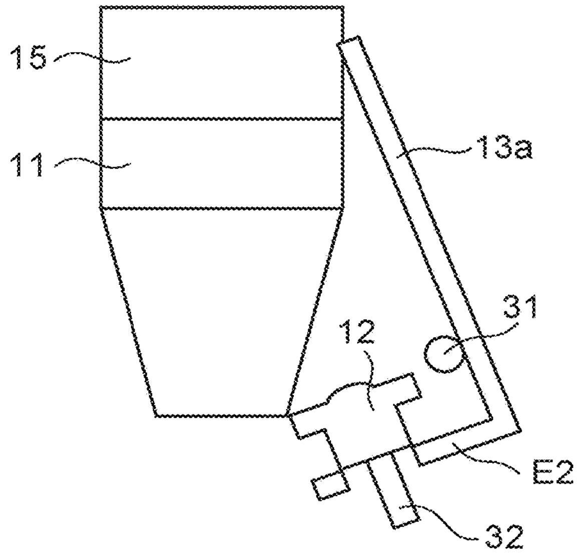
FIG. 27C
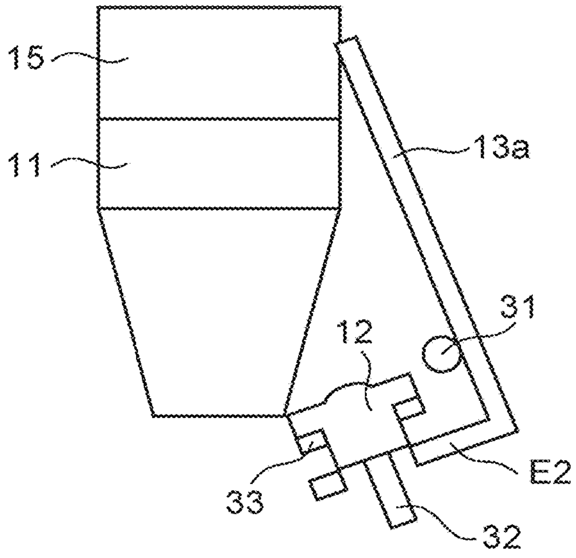
FIG. 27D
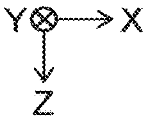

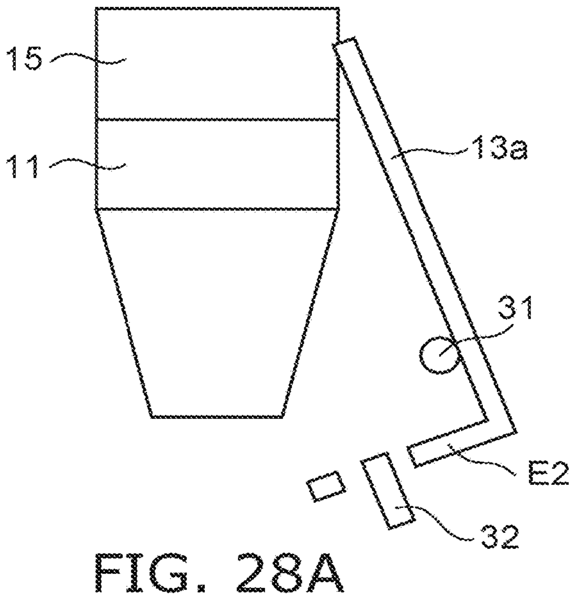
FIG. 28A
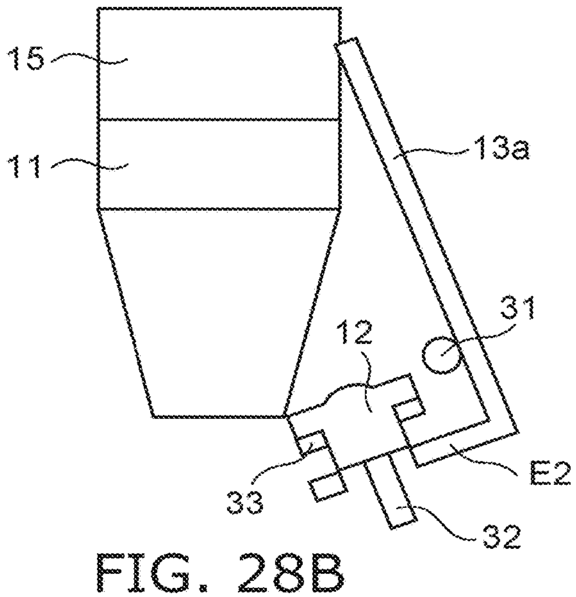
FIG. 28B
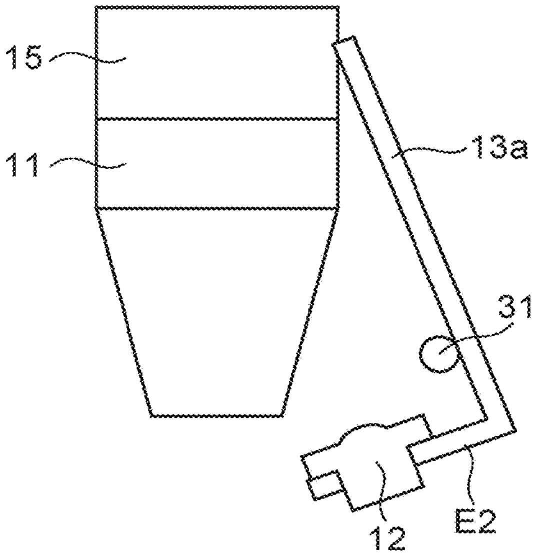
FIG. 28C
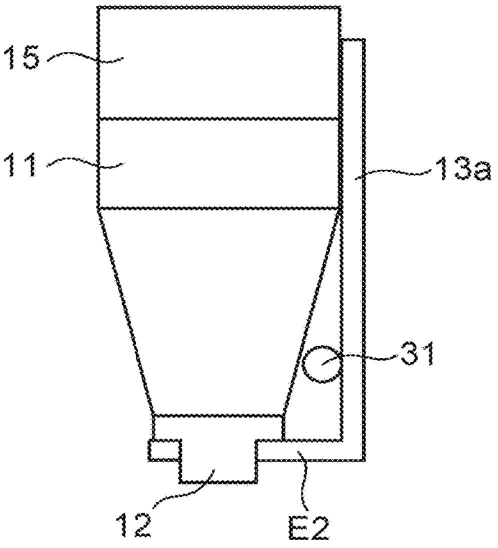
FIG. 28D
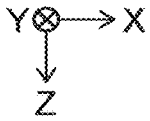

DETECTION DEVICE, DETECTION SYSTEM, AND PROPAGATING MEMBER

CROSS-REFERENCE TO RELATED APPLICATIONS

This application is based upon and claims the benefit of priority from Japanese Patent Application No. 2022-122010, filed on Jul. 29, 2022; the entire contents of which are incorporated herein by reference.

FIELD

Embodiments described herein relate generally to a detection device, a detection system, and a propagating member.

BACKGROUND

There is a detection device that transmits an ultrasonic wave toward an object and detects a reflected wave. The detection device includes a propagating member through which the ultrasonic wave propagates. It is desirable for the propagating member to include few or no bubbles.

BRIEF DESCRIPTION OF THE DRAWINGS

FIGS. 27A to 27D are schematic views illustrating operations of the units for replacing the second propagating member;

FIGS. 28A to 28D are schematic views illustrating operations of the units for replacing the second propagating member;

DETAILED DESCRIPTION

Figure 1:
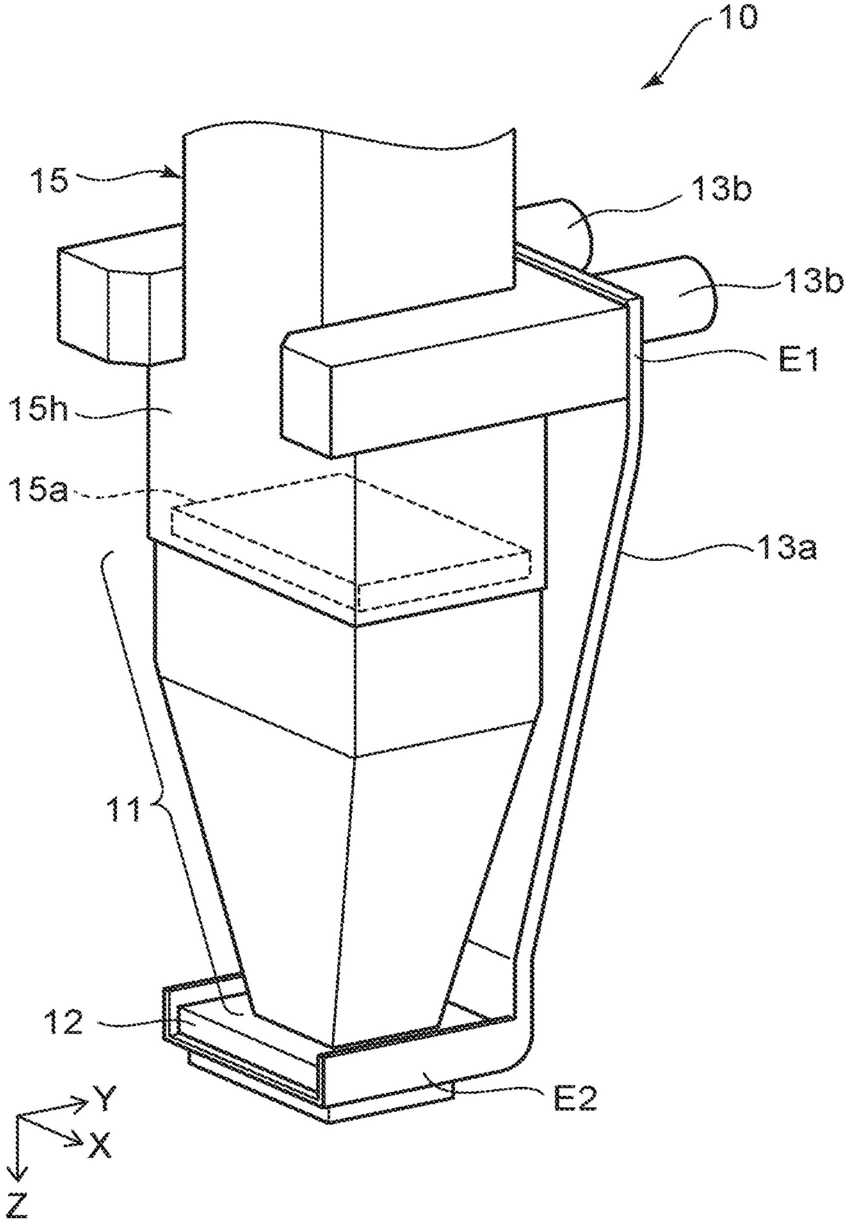
FIG. 1 is a perspective view showing a detection device according to an embodiment.

According to one embodiment, a detection device comprises a detector, a first propagating member, a second propagating member, and a fixture. The detector transmits an ultrasonic wave and detects a reflected wave. The first propagating member is mounted to the detector, and the ultrasonic wave propagates through the first propagating member. The second propagating member includes a second surface contacting a first surface of the first propagating member. The second surface includes a protrusion. The second propagating member is softer than the first propagating member. The ultrasonic wave propagates through the second propagating member after propagating through the first propagating member. The fixture presses a periphery of the second propagating member toward the first propagating member.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

Figure 2:
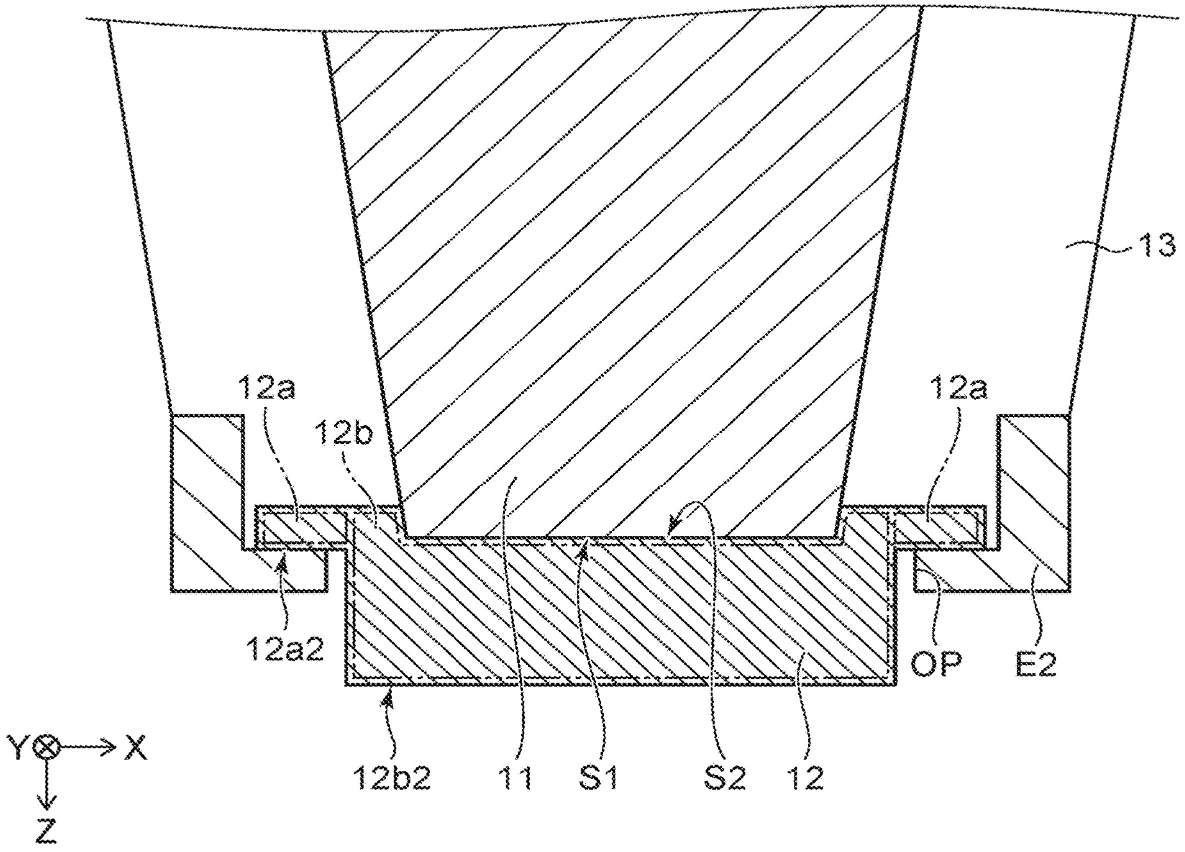
FIG. 2 is a cross-sectional view showing a tip vicinity of the detection device according to the embodiment.

FIG. 1 is a perspective view showing a detection device according to an embodiment. FIG. 2 is a cross-sectional view showing a tip vicinity of the detection device according to the embodiment.

As shown in FIGS. 1 and 2, the detection device 10 according to the embodiment includes a first propagating member 11, a second propagating member 12, a fixture 13, and a detector 15.

The detector 15 transmits an ultrasonic wave and detects a reflected wave. Specifically, the detector 15 includes an element array 15*a* that includes multiple detection elements. The detection elements each transmit the ultrasonic wave. The detection elements each detect the reflected wave of the ultrasonic wave. Herein, the transmission of the ultrasonic wave and the detection of the reflected wave by the detector 15 is called probing. The side of the element array 15*a* is surrounded with a housing 15*h* of the detector 15. The side refers to directions crossing the transmitting direction of the ultrasonic wave.

The first propagating member 11 is mounted to the detector 15 (the housing 15*h*). The ultrasonic wave transmitted from the detector 15 propagates through the first propagating member 11. The first propagating member 11 contacts the detector 15. Or, another member through which the ultrasonic wave can propagate may be located between the first propagating member 11 and the detector 15.

As shown in FIG. 2, the first propagating member 11 includes a first surface S1. The second propagating member 12 includes a second surface S2 that contacts the first surface S1. The ultrasonic wave that propagates through the first propagating member 11 enters the second propagating member 12 and propagates through the second propagating member 12.

Herein, the direction from the first propagating member 11 toward the second propagating member 12 is taken as a Z-direction (a first direction). One direction crossing the Z-direction is taken as an X-direction (a second direction). One direction crossing the Z-X plane is taken as a Y-direction (a third direction). For example, the X-direction, the Y-direction, and the Z-direction are mutually-orthogonal. In the description, the direction from the first propagating member 11 toward the second propagating member 12 is called "down", and the direction from the second propagating member 12 toward the first propagating member 11 is called "up". These directions are based on the relative positional relationship between the first propagating member 11 and the second propagating member 12 and are independent of the direction of gravity.

The first surface S1 and the second surface S2 are parallel to the X-Y plane in a state in which the first propagating member 11 and the second propagating member 12 contact each other. For example, the detector 15, the first propagating member 11, and the second propagating member 12 are arranged in the Z-direction. The transmitting direction of the ultrasonic wave may change in the first propagating member 11. In such a case, the detector 15, the first propagating member 11, and the second propagating member 12 may not be arranged in the Z-direction.

The first propagating member 11 is a solid. The first propagating member 11 is hard enough that substantially no deformation occurs even when operating the detection device 10. Damage of the element array 15*a* can be suppressed thereby. The second propagating member 12 is a gel and is not a liquid. The second propagating member 12 is softer than the first propagating member 11. In other words, the hardness of the second propagating member 12 is less than the hardness of the first propagating member 11. Therefore, the second propagating member 12 deforms more easily than the first propagating member 11. The second propagating member 12 is soft enough to deform according to the surface configuration of the object of the probing when operating the detection device 10.

The fixture 13 presses the periphery of the second propagating member 12 toward the first propagating member 11. The second surface S2 of the second propagating member 12 contacts the first surface S1 of the first propagating member 11 when the second propagating member 12 is pressed by the fixture 13. The second propagating member 12 deforms along the surface configuration of the first propagating member 11. The position of the second propagating member 12 with respect to the first propagating member 11 is fixed by the fixture 13.

The second propagating member 12 separates from the first propagating member 11 when the pressing of the second propagating member 12 by the fixture 13 is released. The second propagating member 12 is detachably fixed with respect to the first propagating member 11.

In the example of FIG. 1, the fixture 13 includes a plate member 13*a* and a fastener 13*b*. The plate member 13*a* includes a first end part E1 and a second end part E2. The first end part E1 is tightened and fixed to the housing 15*h* by the fastener 13*b*. The fastener 13*b* is, for example, a screw. The plate member 13*a* extends along the direction from the housing 15*h* toward the second propagating member 12. The second end part E2 that is at the side opposite to the first end part E1 is bent so that the second propagating member 12 is positioned between the first propagating member 11 and the second end part E2. The periphery of the second propagating member 12 is clamped by the second end part E2 and the first propagating member 11.

The plate member 13*a* may be an elastic leaf spring. The plate member 13*a* applies an elastic force in the direction of pressing the second propagating member 12 toward the first propagating member 11. Instead of the plate member 13*a*, the second propagating member 12 may be pressed by a line-shaped member such as a hard steel wire, etc. The specific structure of the fixture 13 is modifiable as appropriate as long as one end of the fixture 13 can be fixed with respect to the housing 15*h*, and the other end of the fixture 13 includes a pressing member that presses the second propagating member 12 toward the first propagating member 11.

The first propagating member 11 and the second propagating member 12 can include resins. As one specific example, the first propagating member 11 includes an acrylic. The second propagating member 12 includes segmented polyurethane.

For example, the detection device 10 transmits an ultrasonic wave toward a joined body and detects the reflected wave. The acoustic impedance of a general steel plate used in joining is about $4.5\times10^{7}$ (Pa·s/m). It is favorable for the acoustic impedances of the first and second propagating members 11 and 12 each to be greater than $1.0\times10^{5}$ (Pa·s/m) and less than $1.0\times10^{8}$ (Pa·s/m) so that the ultrasonic wave sufficiently propagates between the detection device 10 and the joined body. The acoustic impedance can be measured in accordance with JIS A 1405-1 (ISO 10534-1). The acoustic impedance may be measured in accordance with JIS A 1409 (ISO 354).

To suppress the deformation of the first propagating member 11, it is favorable for the Rockwell hardness (M scale) of the first propagating member 11 to be greater than 80 and less than 110. The Rockwell hardness can be measured in accordance with JIS Z 2245 (ISO 2039-2). It is favorable for the hardness of the second propagating member 12 measured by an Asker durometer Type F to be greater than 40 and less than 60 so that the second propagating member 12 can easily deform according to the surface configuration of the object.

Figure 3A:
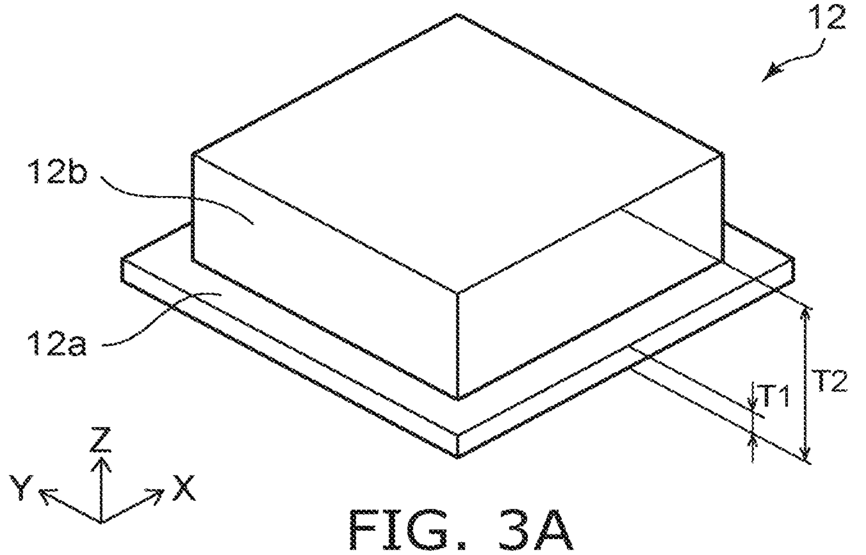
FIGS. 3A and 3B are a perspective view and a plan view showing an example of the second propagating member.
Figure 3B:
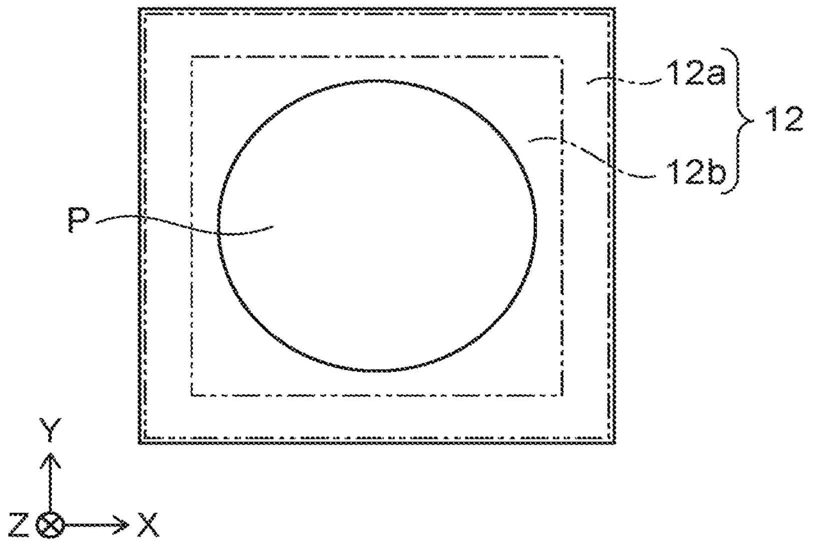

FIGS. 3A and 3B are a perspective view and a plan view showing an example of the second propagating member.

As shown in FIGS. 3A and 3B, the second propagating member 12 includes a first region 12*a* and a second region 12*b*.

The second propagating member 12 is quadrilateral when viewed along the Z-direction. The first region 12*a* is positioned at the outer perimeter of the second propagating member 12 and is pressed by the fixture 13. The second region 12*b* is surrounded with the first region 12*a* along the X-Y plane. The second region 12*b* includes the center of the second propagating member 12 in the X-Y plane.

As shown in FIG. 3A, the second region 12*b* protrudes further in the Z-direction than the first region 12*a*. A thickness T2 of the second region 12*b* is greater than a thickness T1 of the first region 12*a*. The thickness corresponds to the Z-direction length.

As shown in FIG. 2, the first region 12*a* is pressed toward the first propagating member 11 by the fixture 13. The first region 12*a* is deformed, and the thickness of the first region 12*a* is reduced. For example, the second region 12*b* is closely adhered to the first propagating member 11.

Figure 4:
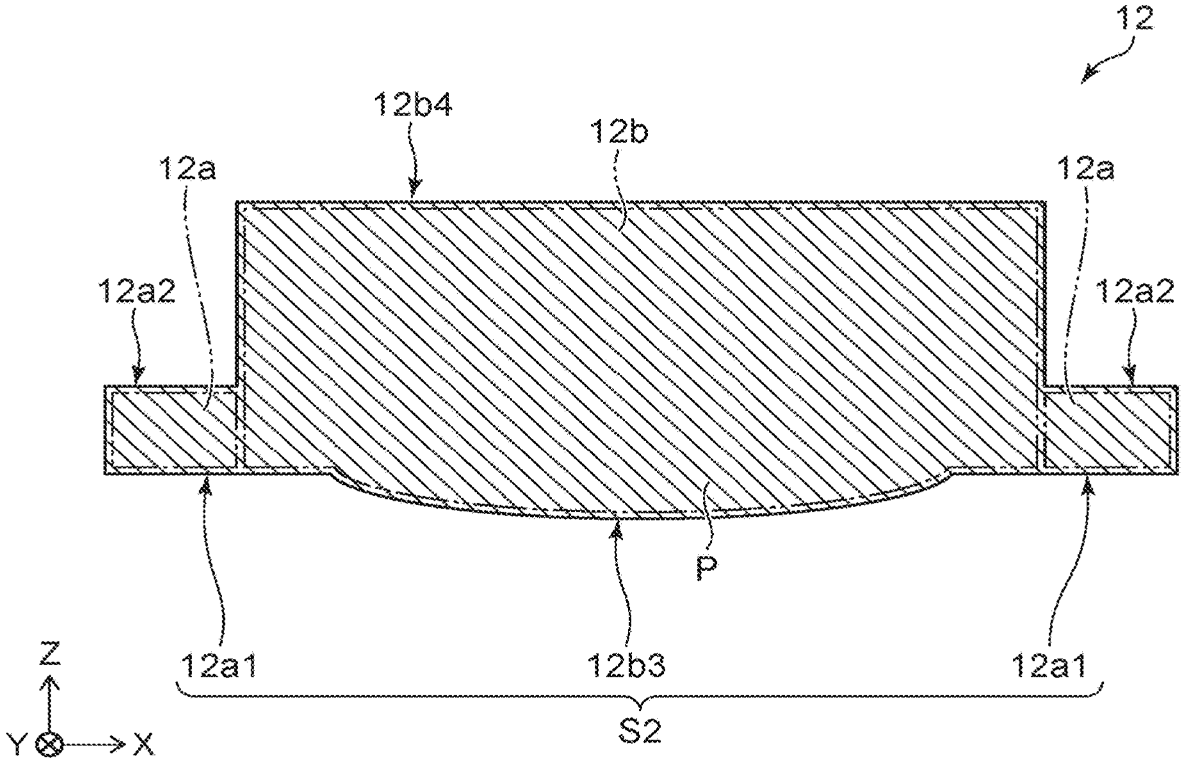
FIG. 4 is a cross-sectional view showing the second propagating member.

FIG. 4 is a cross-sectional view showing the second propagating member.

As shown in FIG. 4, the first region 12*a* includes a first partial surface 12*a*1 and a second partial surface 12*a*2 that cross the Z-direction. The second partial surface 12*a*2 is positioned at the side opposite to the first partial surface 12*a*1. The second region 12*b* includes a third partial surface 12*b*3 and a fourth partial surface 12*b*4 crossing the Z-direction. The fourth partial surface 12*b*4 is positioned at the side opposite to the third partial surface 12*b*3.

The third partial surface 12*b*3 is connected with the first partial surface 12*a*1. In the illustrated example, the Z-direction position of the outer perimeter of the third partial surface 12*b*3 is the same as the Z-direction position of the first partial surface 12*a*1. The second surface S2 of the second propagating member 12 includes the first partial surface 12*a*1 and the third partial surface 12*b*3. The Z-direction position of the second partial surface 12*a*2 is between the Z-direction position of the third partial surface 12*b*3 and the Z-direction position of the fourth partial surface 12*b*4. In other words, the fourth partial surface 12*b*4 protrudes with respect to the second partial surface 12*a*2.

As shown in FIGS. 3B and 4, a protrusion P is provided in the third partial surface 12*b*3 of the second surface S2. In the illustrated example, the protrusion P is spherical. The protrusion P may be circular conical or pyramidal. The Z-direction position of the first partial surface 12*a*1 is between the Z-direction position of the apex of the protrusion P and the Z-direction position of the second partial surface 12*a*2. In other words, the protrusion P protrudes with respect to the first partial surface 12*a*1. When the second propagating member 12 contacts the first propagating member 11, the protrusion P protrudes toward the first surface S1 of the first propagating member 11.

Figure 5A:
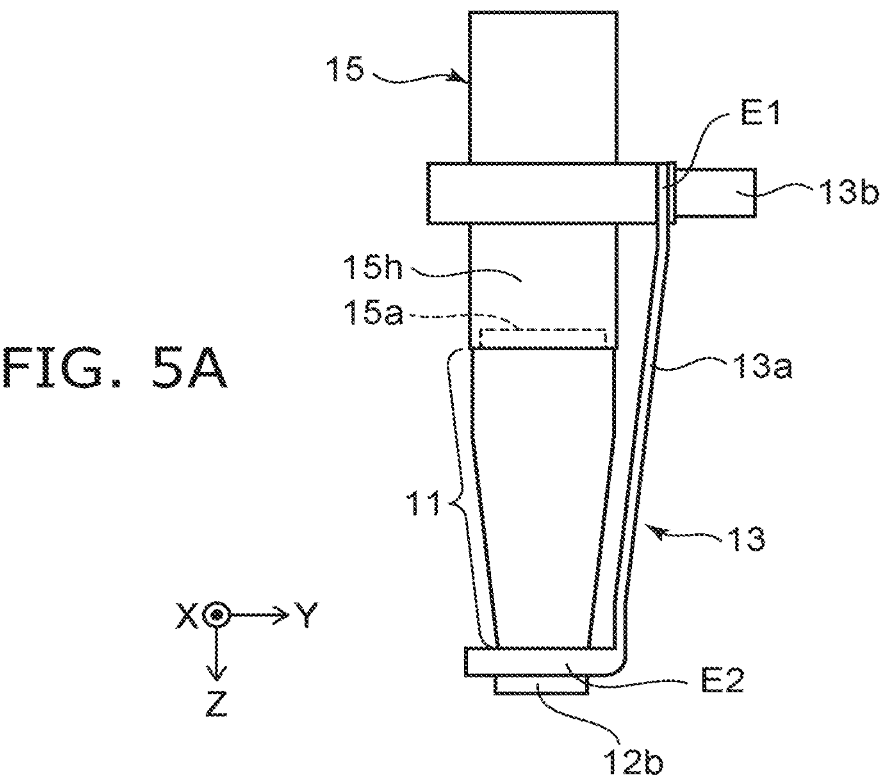
FIGS. 5A and 5B are side views showing the detection device according to the embodiment.
Figure 5B:
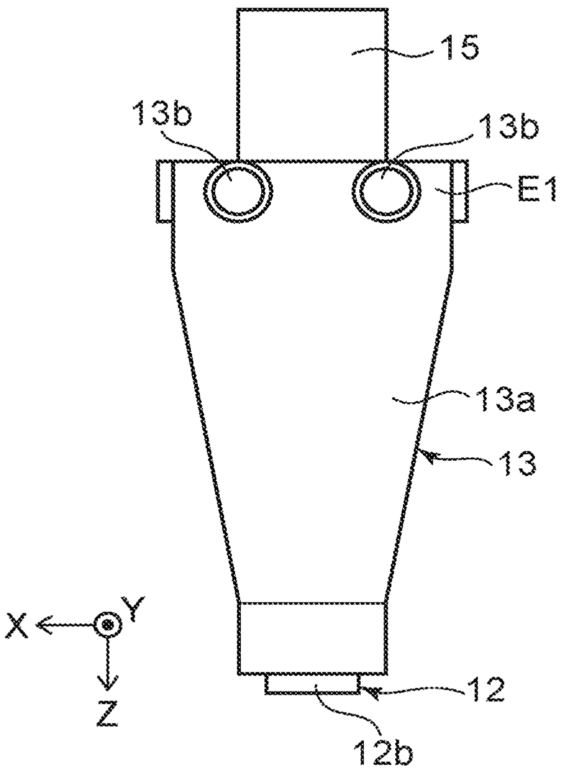

FIGS. 5A and 5B are side views showing the detection device according to the embodiment.

As shown in FIG. 2, an opening OP is formed in the second end part E2 of the plate member 13*a*. The opening OP extends through the second end part E2 along the Z-direction. The second region 12*b* of the second propagating member 12 is inserted into the opening OP. When the first region 12*a* is pressed by the fixture 13, the second region 12*b* protrudes further in the Z-direction than the second end part E2 of the fixture 13 as shown in FIGS. 2, 5A, and 5B. When probing, the second region 12*b* that protrudes from the fixture 13 deforms along the surface configuration of the object.

In the detection device 10 as shown in FIG. 1, the width of the tip (the first surface S1) of the first propagating member 11 is less than the width of the element array 15*a*. The ultrasonic wave that is transmitted from the element array 15*a* is converged toward the tip of the first propagating member 11 and emitted from the entire surface of the first surface S1. The width is the length in the X-direction or the Y-direction. By setting the width of the first surface S1 to be less than the width of the element array 15*a*, the tip of the detection device 10 can easily contact the desired portion of the object even when the shape of the object is complex, many obstacles exist, etc.

The width of the second surface S2 of the second propagating member 12 is greater than the width of the first surface S1 of the first propagating member 11. When the second propagating member 12 is pressed toward the first propagating member 11, a portion of the second propagating member 12 extends around to the side of the first propagating member 11 and contacts a portion of the side surface of the first propagating member 11.

It is favorable for the width of the second region 12*b* to be equal to the width of the first surface S1 or greater than the width of the first surface S1. When the width of the second region 12*b* is less than the width of the first surface S1, the ultrasonic wave that is emitted from the outer perimeter of the first surface S1 is reflected by the fixture 13 and does not reach the object. When the width of the second region 12*b* is not less than the width of the first surface S1, the ultrasonic wave that is emitted from the first surface S1 easily propagates to the second region 12*b* contacting the object. The accuracy of the probing can be increased.

It is favorable for the width of the opening OP to be greater than the width of the first surface S1. When the second propagating member 12 is fixed, shear stress is applied by the first propagating member 11 and the fixture 13 to the outer perimeter of the second propagating member 12. When the width of the opening OP is equal to the width of the first surface S1, the shear stress becomes large, and the second propagating member 12 is easily damaged. It is therefore favorable for the width of the opening OP to be greater than the width of the first surface S1.

Figure 6A:
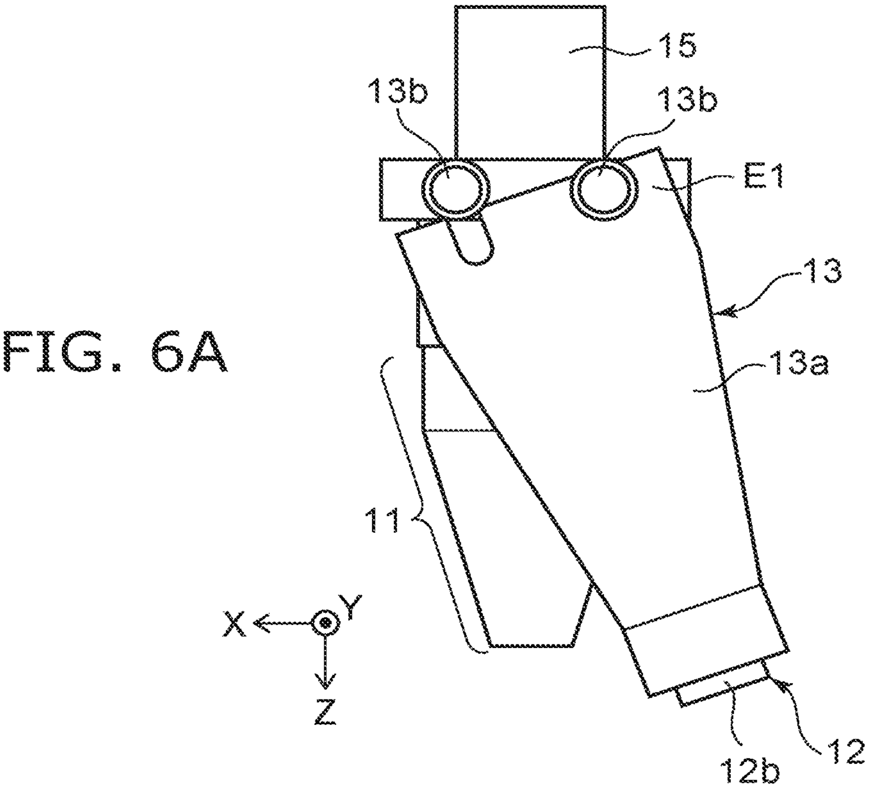
FIGS. 6A and 6B are a side view and a perspective view showing the detection device according to the embodiment.
Figure 6B:
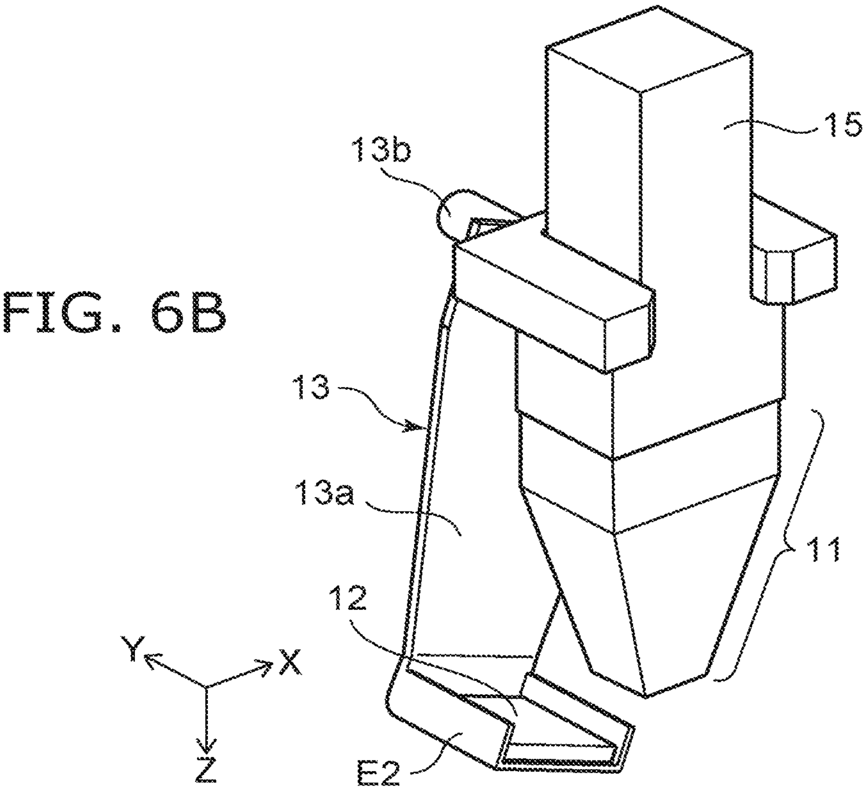

FIGS. 6A and 6B are a side view and a perspective view showing the detection device according to the embodiment.

The fixture 13 detachably fixes the second propagating member 12 with respect to the first propagating member 11. In other words, the fixture 13 can be used to switch between a state in which the second propagating member 12 is fixed with respect to the first propagating member 11 and a state in which the second propagating member 12 is not fixed with respect to the first propagating member 11.

For example, as shown in FIGS. 6A and 6B, the plate member 13*a* can be detached from the housing 15*h* by loosening the fastener 13*b*. When the plate member 13*a* is detached from the housing 15*h*, the distance between the second end part E2 and the first propagating member 11 is increased. The pressing from the second end part E2 toward the second propagating member 12 is eliminated thereby. The second propagating member 12 is detachable. The second propagating member 12 can be detached, and another new second propagating member 12 can be mounted.

Or, the plate member 13*a* may be a leaf spring. In such a case, the second end part E2 may be moved away from the first propagating member 11 by deforming the plate member 13*a*. The pressing from the second end part E2 toward the second propagating member 12 is eliminated, and the second propagating member 12 can be detached.

FIGS. 7A to 7D are side views schematically showing another fixture.

Figure 7A:
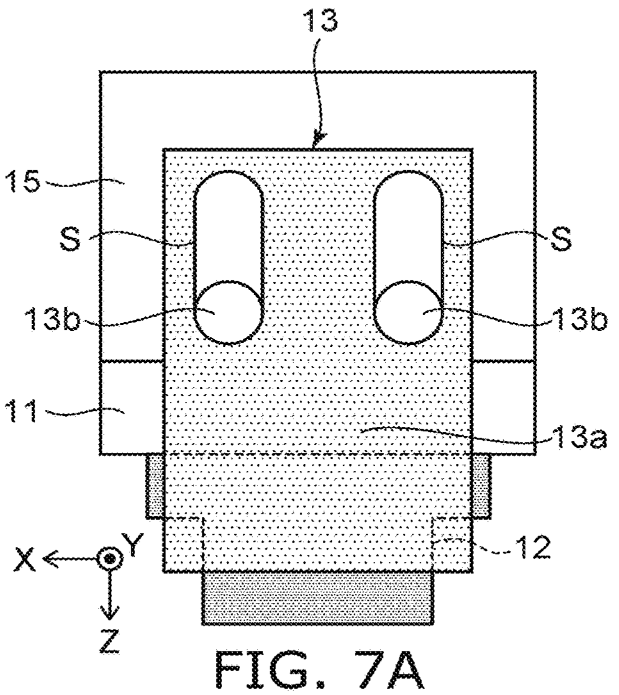
FIGS. 7A to 7D are side views schematically showing another fixture.
Figure 7B:
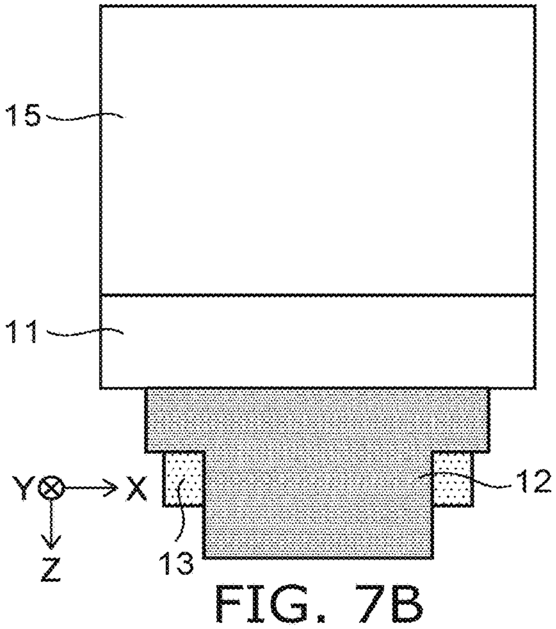
Figure 7C:
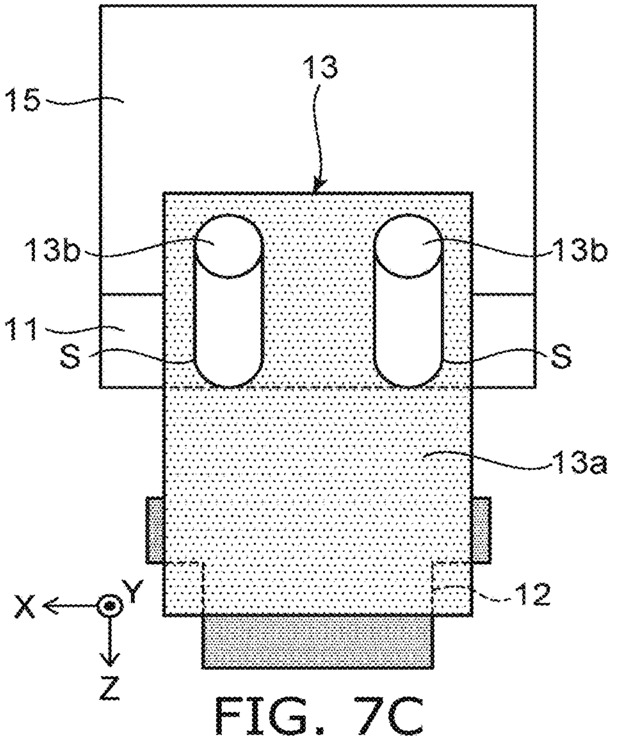
Figure 7D:
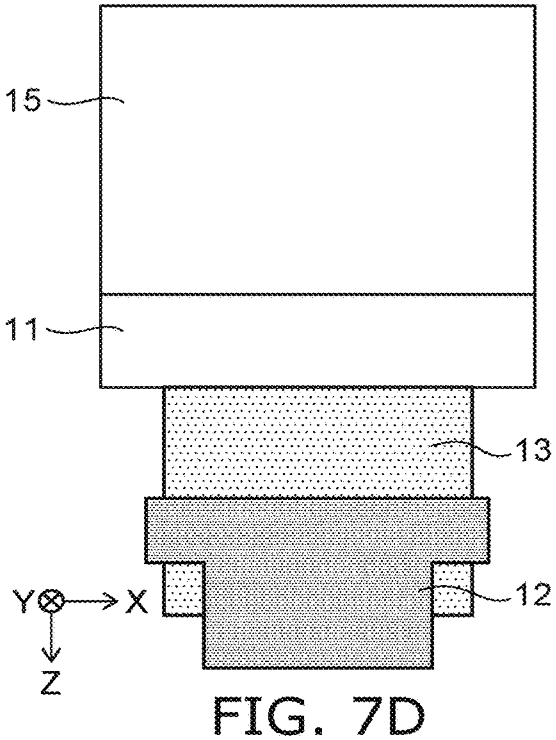

FIGS. 7A and 7B show a state in which the second propagating member 12 is fixed with respect to the first propagating member 11. FIGS. 7C and 7D show a state in which the second propagating member 12 is not fixed with respect to the first propagating member 11. FIGS. 7B and 7D respectively show the fixture 13 when viewed from a viewpoint in the opposite direction of the viewpoint of FIGS. 7A and 7C.

As shown in FIGS. 7A to 7D, a slit S may be provided in the plate member 13*a*. The slit S extends along the Z-direction. The plate member 13*a* can slide along the direction in which the slit S extends when the fastener 13*b* is loosened. As the plate member 13*a* slides, the second end part E2 of the plate member 13*a* moves away from the first propagating member 11 as shown in FIGS. 7C and 7D. The pressing from the second end part E2 toward the second propagating member 12 is eliminated, and the second propagating member 12 can be detached.

It is favorable for no air to exist between the detection device and the object when using the ultrasonic wave to check the state of the object. When no air exists, the ultrasonic wave easily propagates between the detection device and the object; and the reflected wave is easily detected. The accuracy of the probing is increased. Conventionally, a liquid couplant having good acoustic impedance is used so that the ultrasonic wave easily propagates. The couplant fills the gap between the detection device and the object by causing the detection device to contact the object on which the couplant is pre-coated.

When a couplant is used, it is necessary to wipe the couplant after probing. If the couplant is left adhered to the object, the surface of the object may be altered (e.g., rust), degraded, etc. Furthermore, it takes time to wipe the couplant. Technology is desirable in which the coating and wiping of the couplant can be omitted to reduce the probing time.

According to the detection device 10, the second propagating member 12 is used instead of the couplant. The second propagating member 12 is softer than the first propagating member 11 and deformable according to the surface configuration of the object when operating the detection device 10. The air between the first propagating member 11 and the object can be reduced by the second propagating member 12 deforming to fill the gap between the first propagating member 11 and the object.

On the other hand, the second propagating member 12 is soft, and therefore easily scratched. Also, foreign matter (e.g., metal powder or the like) that is adhered to the object easily punctures the second propagating member 12. Abnormalities such as scratches, foreign matter adhesion, or the like of the surface of the second propagating member 12 make it difficult for the ultrasonic wave to propagate between the second propagating member 12 and the object. The accuracy of the detection of the ultrasonic wave is reduced. It is therefore favorable to replace the second propagating member 12 at an appropriate timing. In the detection device 10, the second propagating member 12 is detachably fixed by the fixture 13. Therefore, the second propagating member 12 can be easily replaced.

Some advantages of the embodiment will now be described.

FIG. 8A, FIG. 8B, FIG. 9A, and FIG. 9B are cross-sectional views showing portions of detection devices according to reference examples.

Figure 8A:
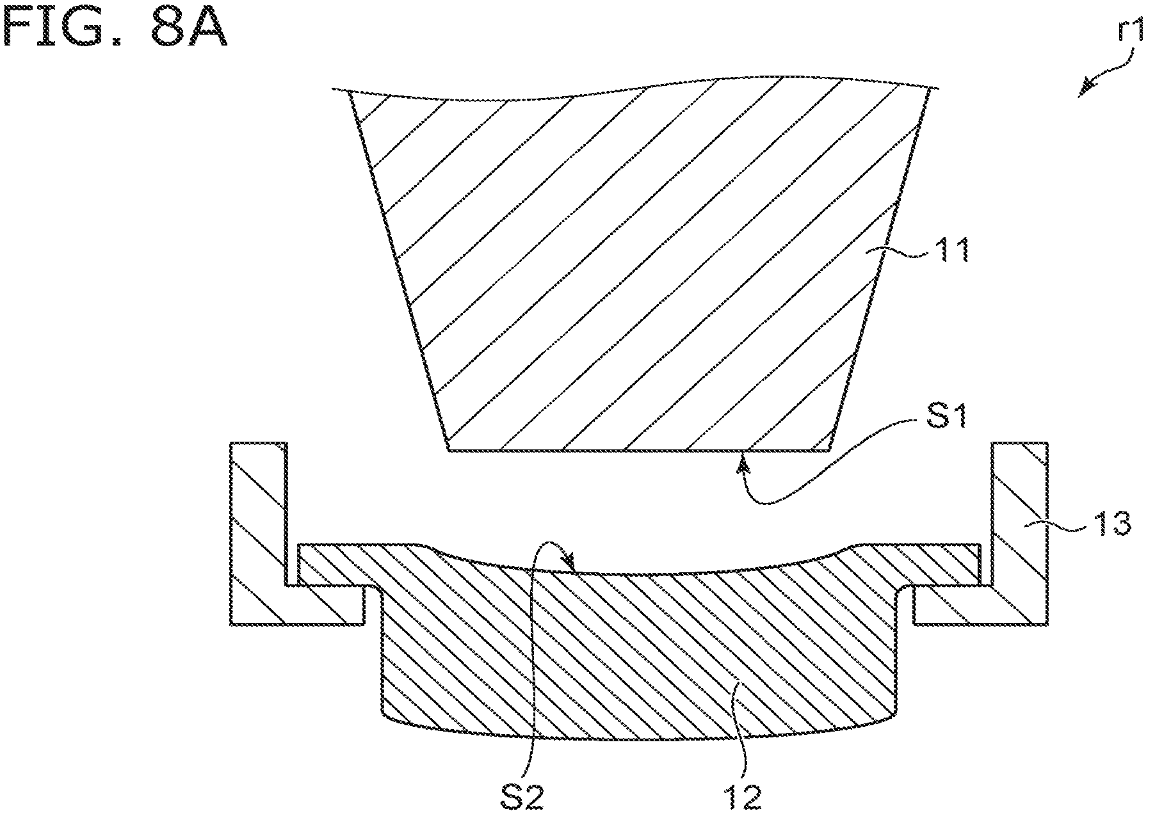
FIGS. 8A and 8B are cross-sectional views showing a portion of detection devices according to a reference example.

In a detection device r1 according to the reference example shown in FIG. 8A, the second propagating member 12 does not include the protrusion P. Only the periphery of the second propagating member 12 contacts the fixture 13 when the second propagating member 12 is placed on the fixture 13. The second propagating member 12 is soft enough to deform along the surface configuration of the object. Therefore, as shown in FIG. 8A, the second region 12*b* deforms in the direction of gravity due to its own weight. A recess is formed in the second surface S2. In particular, the second region 12*b* easily deforms when the hardness of the second propagating member 12 measured by an Asker durometer Type F is 40 to 60 as described above.

Figure 8B:
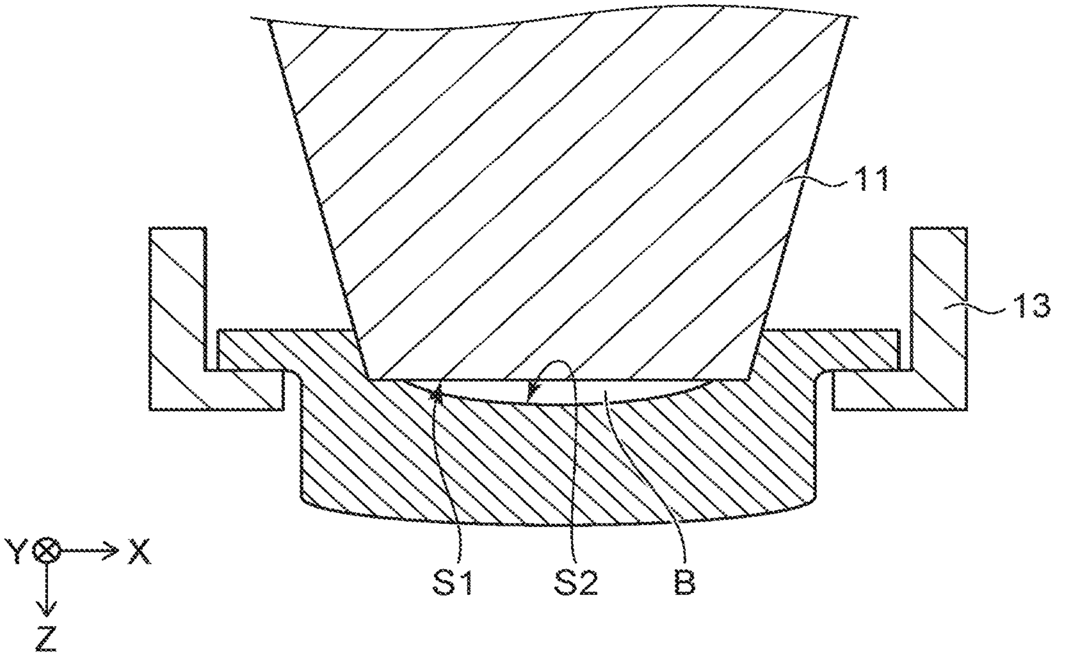

In the state shown in FIG. 8A, a bubble B forms between the first surface S1 and the second surface S2 as shown in FIG. 8B when the second propagating member 12 is pressed onto the first propagating member 11. The ultrasonic wave propagates less easily through the bubble B (air) than the first propagating member 11 or the second propagating member 12. The ultrasonic wave does not easily reach the object, making it difficult to detect the reflected wave that indicates the state of the object. The accuracy of the probing is reduced, and it is difficult to check the state of the object based on the reflected wave. It is therefore desirable for the bubble B not to exist between the first propagating member 11 and the second propagating member 12.

Figure 9A:
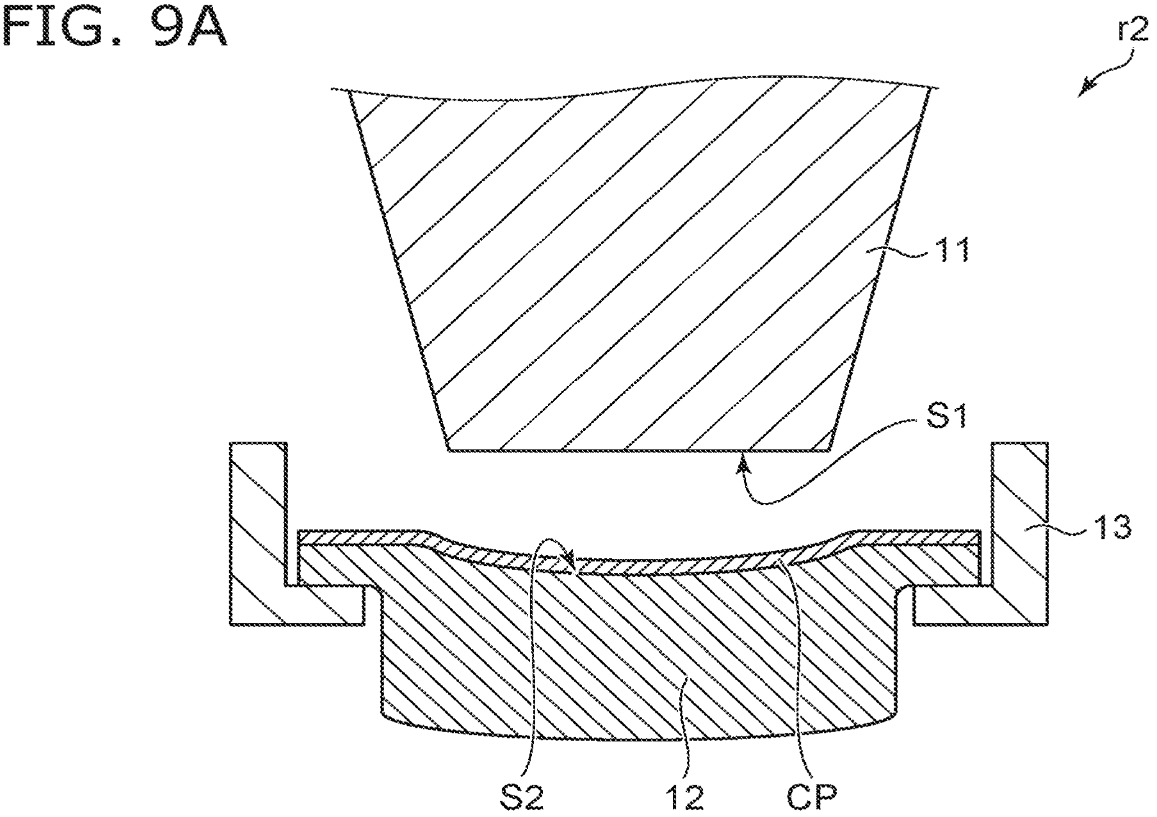
FIGS. 9A and 9B are cross-sectional views showing a portion of detection devices according to a reference example.
Figure 9B:
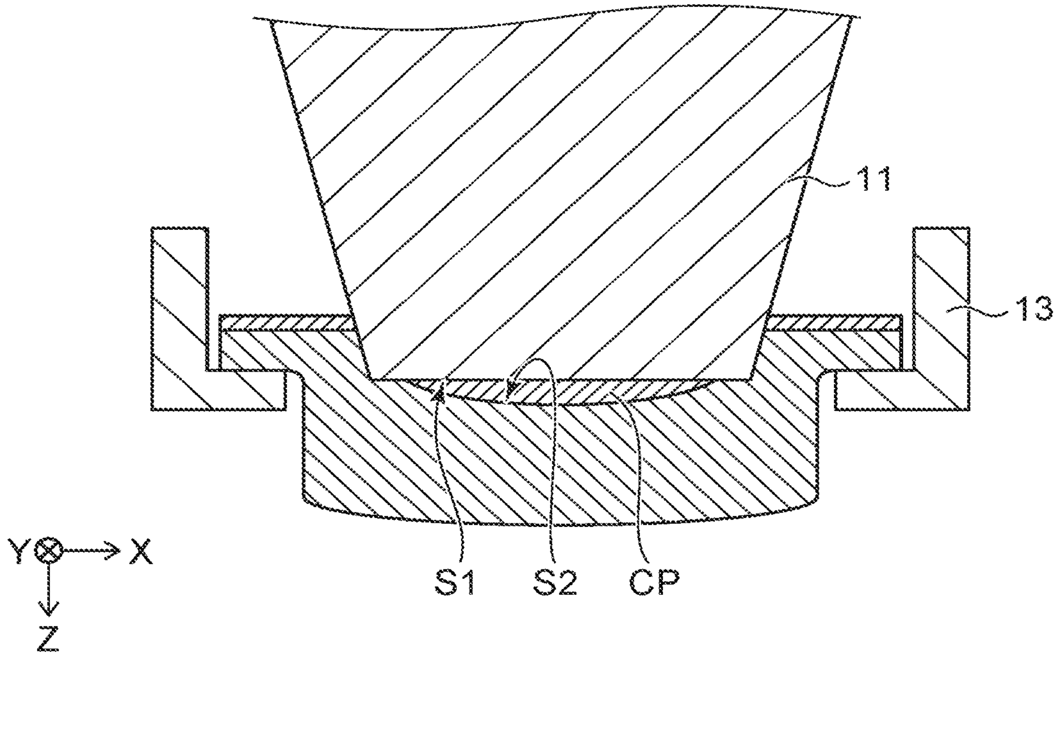

In a detection device r2 according to the reference example shown in FIG. 9A, a couplant CP is coated onto the second surface S2. The couplant CP is a liquid. By pressing the second propagating member 12 onto which the couplant CP is coated toward the first propagating member 11 as shown in FIG. 9B, the couplant fills the gap between the first surface S1 and the second surface S2; and the occurrence of the bubble B can be prevented.

The ultrasonic wave propagates more easily through the couplant CP than air. By using the couplant CP, the ultrasonic wave easily reaches the object. According to the detection device r2, compared to the detection device r1, the accuracy of the probing can be increased. On the other hand, in the detection device r2, the propagation velocity of the ultrasonic wave is different between the portion at which the couplant CP exists and the portion at which the couplant CP does not exist. Therefore, there is still room for improvement for the accuracy of the probing of the detection device r2.

Figure 10A:
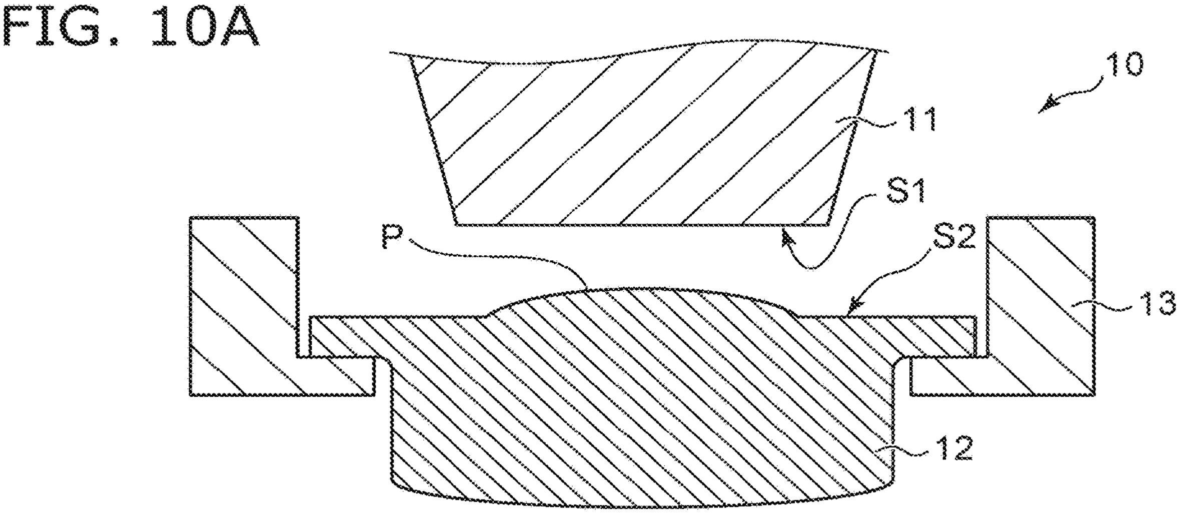
FIGS. 10A to 10C are cross-sectional views showing a portion of the detection device according to the embodiment.
Figure 10B:
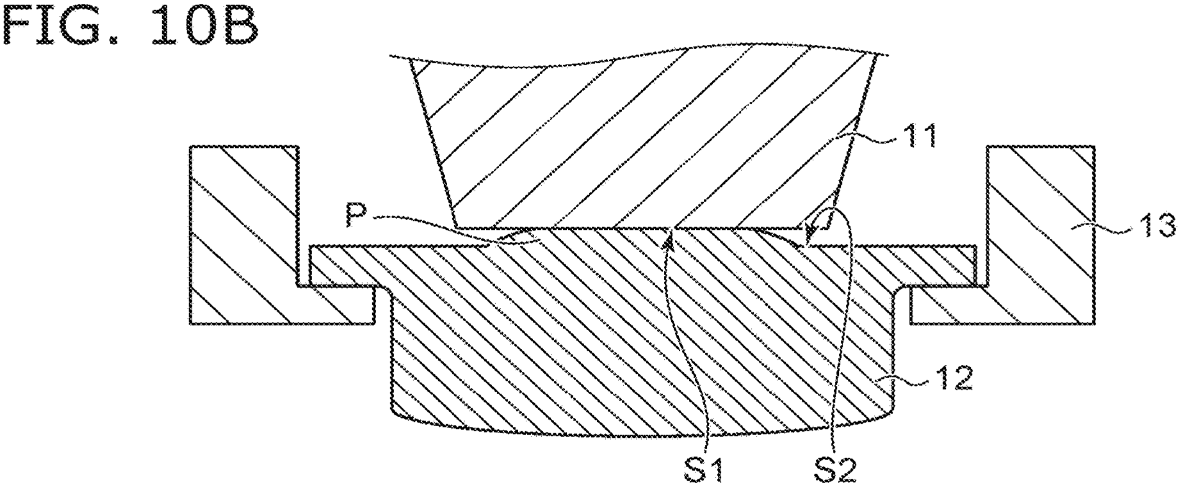
Figure 10C:
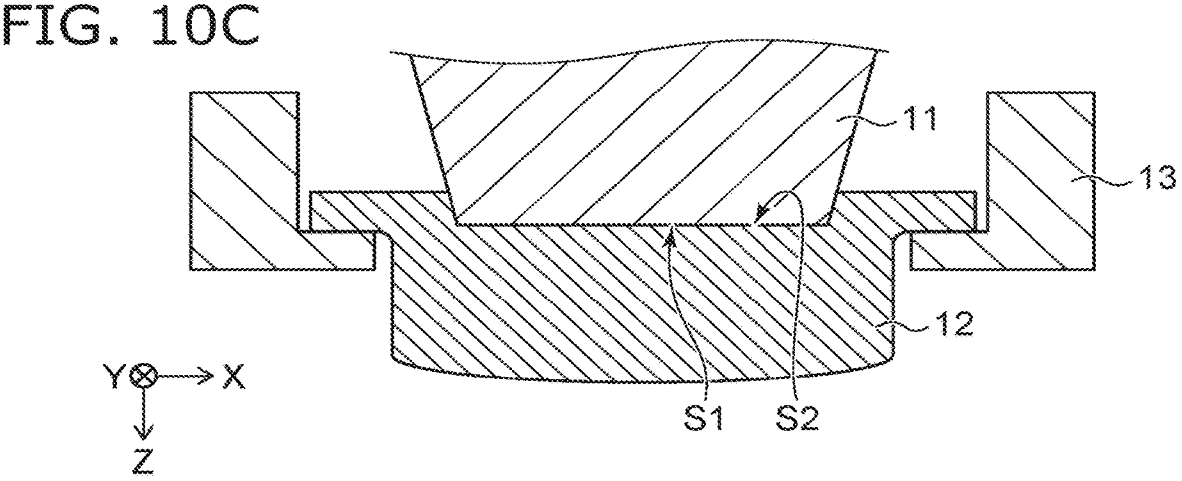

FIGS. 10A to 10C are cross-sectional views showing a portion of the detection device according to the embodiment.

In the detection device 10 according to the embodiment as shown in FIG. 10A, the second propagating member 12 includes the protrusion P. When the second propagating member 12 is pressed toward the first propagating member 11, first, the protrusion P contacts the first surface S1 of the first propagating member 11 as shown in FIG. 10B. When the second propagating member 12 is pressed further toward the first propagating member 11 in this state, the second surface S2 of the second propagating member 12 is closely adhered to the first surface S1 as shown in FIG. 10C. Even when the couplant CP is not used, the occurrence of the bubble B between the first surface S1 and the second surface S2 can be suppressed by the protrusion P.

According to the embodiment, the occurrence of the bubble B between the first propagating member 11 and the second propagating member 12 can be suppressed. Also, the propagation velocity fluctuation of the ultrasonic wave at each point between the first propagating member 11 and the second propagating member 12 can be reduced. As a result, a more accurate probing result is obtained.

To effectively suppress the occurrence of the bubble B, it is favorable for the width of the area in which the protrusion P is located to be greater than 0.3 times the width of the second region 12*b*. More favorably, the width of the area in which the protrusion P is located is greater than 0.5 times the width of the second region 12*b*.

Other advantages of the embodiment will now be described.

Figure 11A:
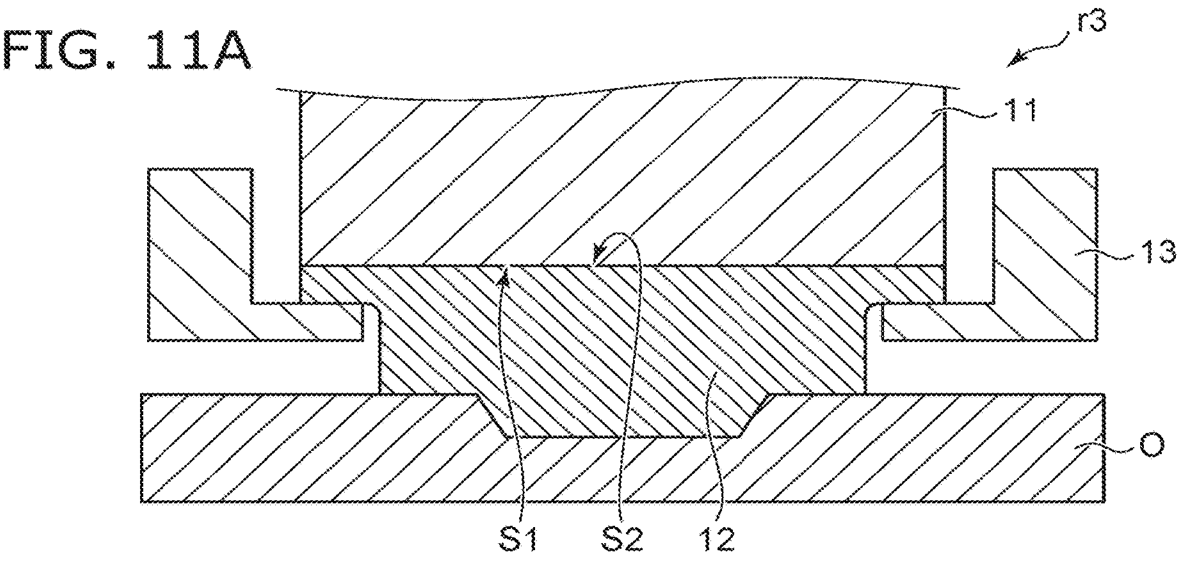
FIGS. 11A to 11C are cross-sectional views showing a portion of a detection device according to a reference example.
Figure 11B:
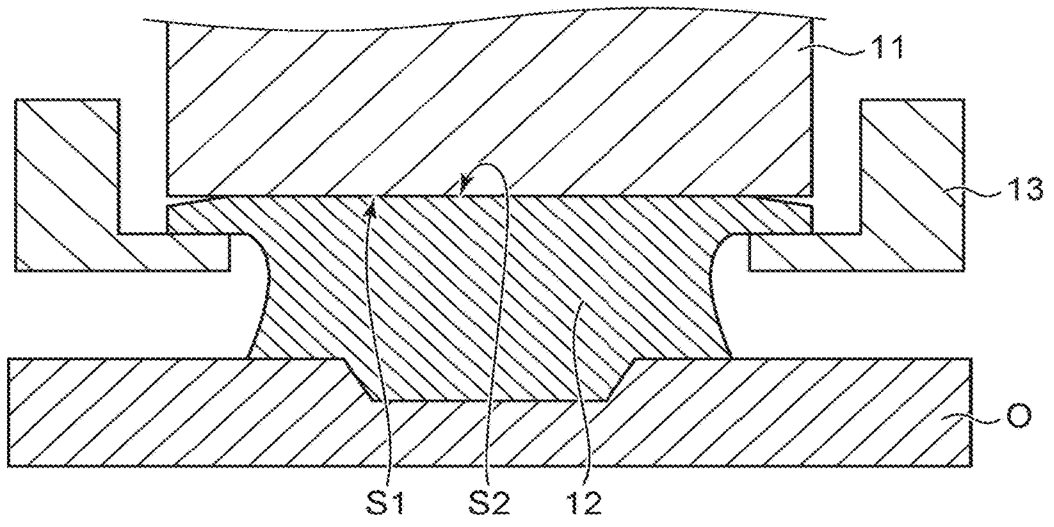
Figure 11C:
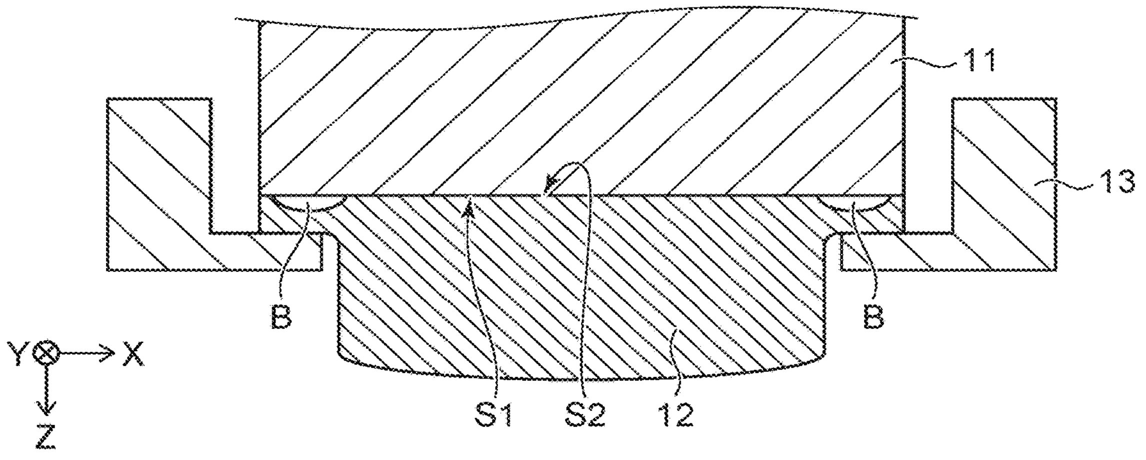

FIGS. 11A to 11C are cross-sectional views showing a portion of a detection device according to a reference example.

In the detection device r3 according to the reference example shown in FIG. 11A, the width of the second surface S2 is equal to the width of the first surface S1. FIG. 11A shows the state when probing. The second propagating member 12 contacts an object O.

After the probing is finished, the detection device r3 moves away from the object O. The second propagating member 12 is a gel and may adhere to the object O. When the second propagating member 12 is separated from the object O, the second propagating member 12 is pulled toward the object O. Accordingly, as shown in FIG. 11B, there are cases where the outer perimeter of the second surface S2 partially detaches from the first surface S1.

When the second propagating member 12 is subsequently separated from the object O, the detached portion of the second surface S2 re-contacts the first surface S1. At this time, as shown in FIG. 11C, there are cases where the bubble B forms between the first surface S1 and the detached outer perimeter of the second surface S2. More bubbles B form as the probing is repeated. Such bubbles B gradually move toward the center vicinity of the first surface S1. As a result, it is difficult to check the state of the object based on the reflected wave.

Figure 12A:
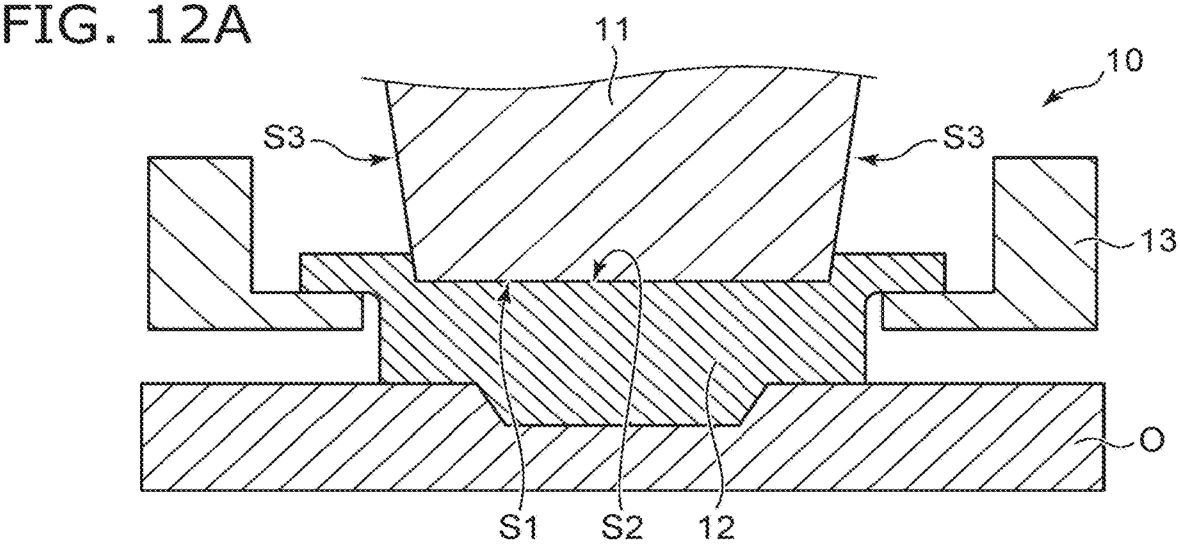
FIGS. 12A to 12C are cross-sectional views showing a portion of the detection device according to the embodiment.
Figure 12B:
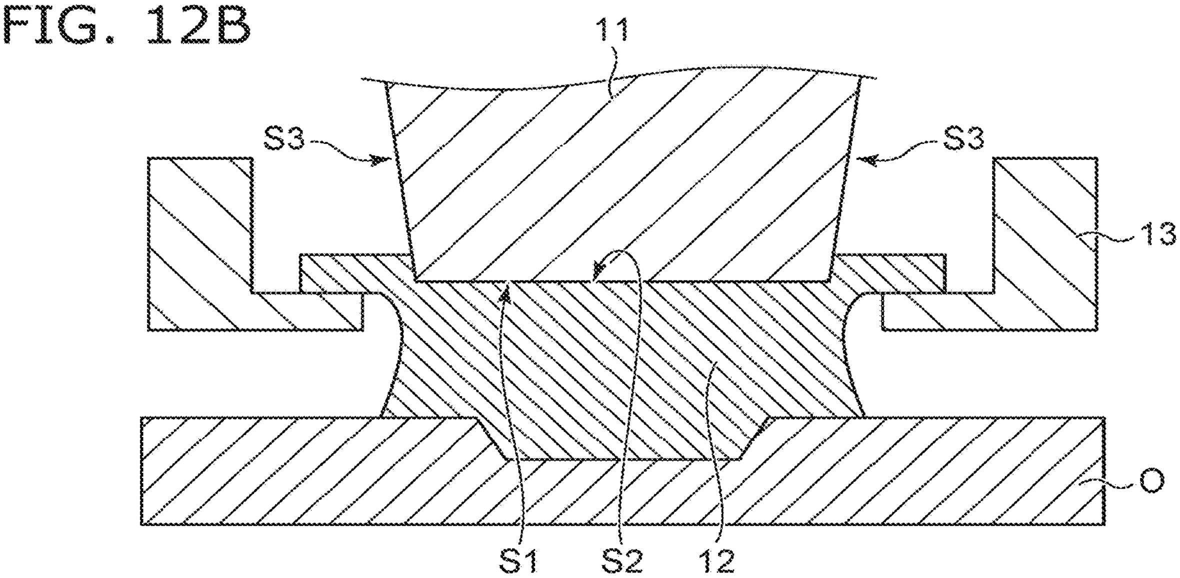
Figure 12C:
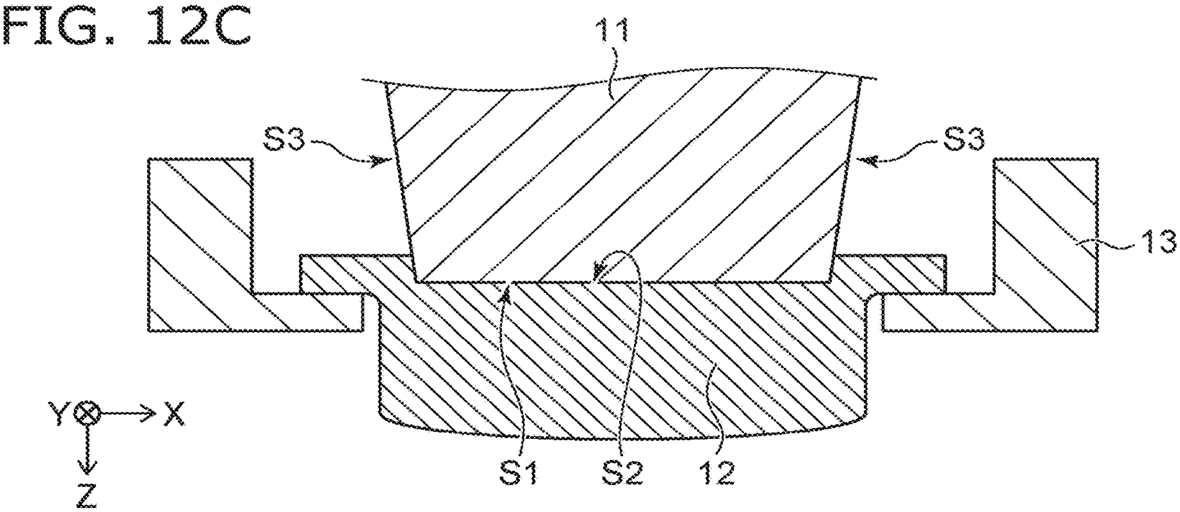

FIGS. 12A to 12C are cross-sectional views showing a portion of the detection device according to the embodiment.

In the detection device 10 according to the embodiment as shown in FIG. 12A, the width of the second surface S2 is greater than the width of the first surface S1. The second propagating member 12 contacts a portion of a third surface S3 of the first propagating member 11. The third surface S3 is connected to the first surface S1 and oblique to the first surface. The third surface S3 crosses the X-direction or the Y-direction.

When the detection device 10 is separated from the object the tilt with respect to the Z-direction of the contact surface between the second propagating member 12 and the third surface S3 is less than the tilt with respect to the Z-direction of the contact surface between the second propagating member 12 and the first surface S1. The friction force acting between the second propagating member 12 and the third surface S3 is greater than the friction force acting between the second propagating member 12 and the first surface S1. Therefore, as shown in FIG. 12B, even when the second propagating member 12 is pulled toward the object O, the detachment of the outer perimeter of the second surface S2 from the first surface S1 can be suppressed.

As a result, as shown in FIG. 12C, the occurrence of the bubble B between the first surface S1 and the second surface S2 can be suppressed. According to the embodiment, a more accurate probing result is obtained even when the second propagating member 12 is repeatedly caused to contact and detach from the object O.

The couplant CP also may be coated onto the second surface S2 as shown in FIG. 9A. The lubrication between the first propagating member 11 and the second propagating member 12 is improved by coating the couplant CP. The second surface S2 smoothly contacts the first surface S1 or the third surface S3 even when the outer perimeter of the second surface S2 is detached in the state shown in FIG. 11B. Air easily flows outward from the first and second propagating members 11 and 12; and the occurrence of bubbles can be suppressed.

FIG. 13A, FIG. 14A, FIG. 15A, FIG. 16A, FIG. 17A, and FIG. 18A are plan views showing other examples of the second propagating member. FIG. 13B, FIG. 14B, FIG. 15B, FIG. 16B, FIG. 17B, and FIG. 18B are B1-B2 cross-sectional views of FIGS. 13A to 18A.

Figure 13A:
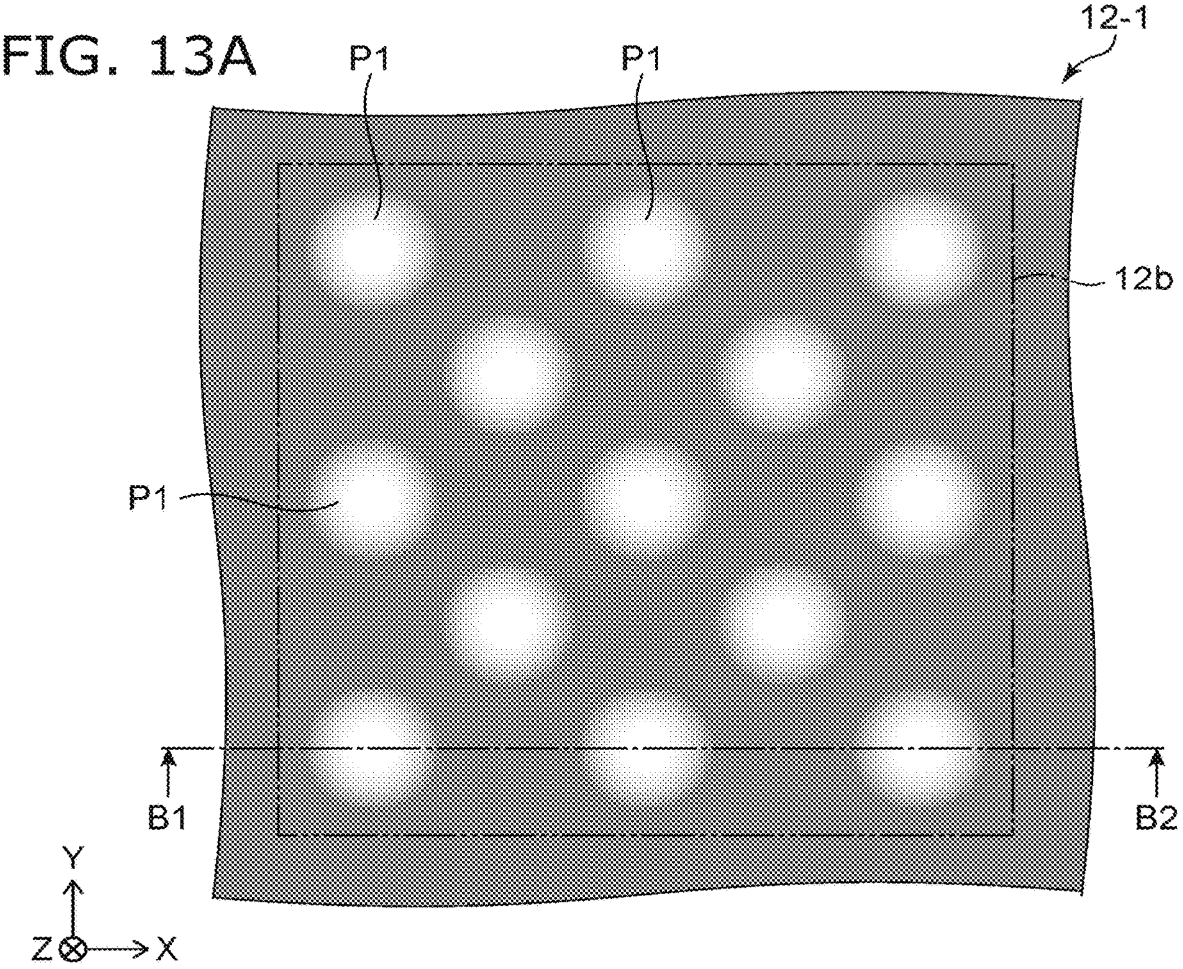
FIG. 13A is a plan view showing another example of the second propagating member.
Figure 13B:
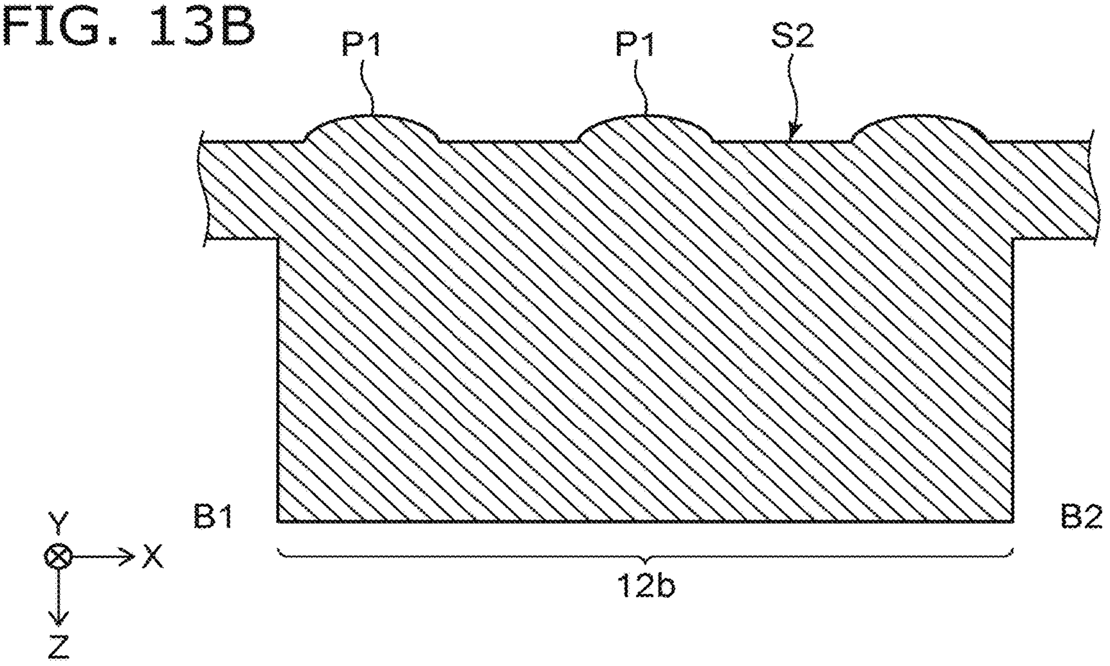
FIG. 13B is a B1-B2 cross-sectional view of FIG. 13A.

In a second propagating member 12-1 shown in FIGS. 13A and 13B, multiple protrusions P1 are provided in the second surface S2. In the plan view of FIGS. 13A to 18A, a whiter color indicates that the point protrudes further upward. A blacker color indicates that the point is recessed further downward.

The multiple protrusions P1 are arranged along two directions that cross each other. According to the second propagating member 12-1, at least one of the protrusions P1 initially contacts the first surface S1 when the second surface S2 of the second propagating member 12 contacts the first surface S1 of the first propagating member 11. The air between the first surface S1 and the second surface S2 flows outward from the first and second propagating members 11 and 12 via the gap between the protrusions P1. The occurrence of bubbles between the first surface S1 and the second surface S2 can be suppressed thereby.

Figure 14A:
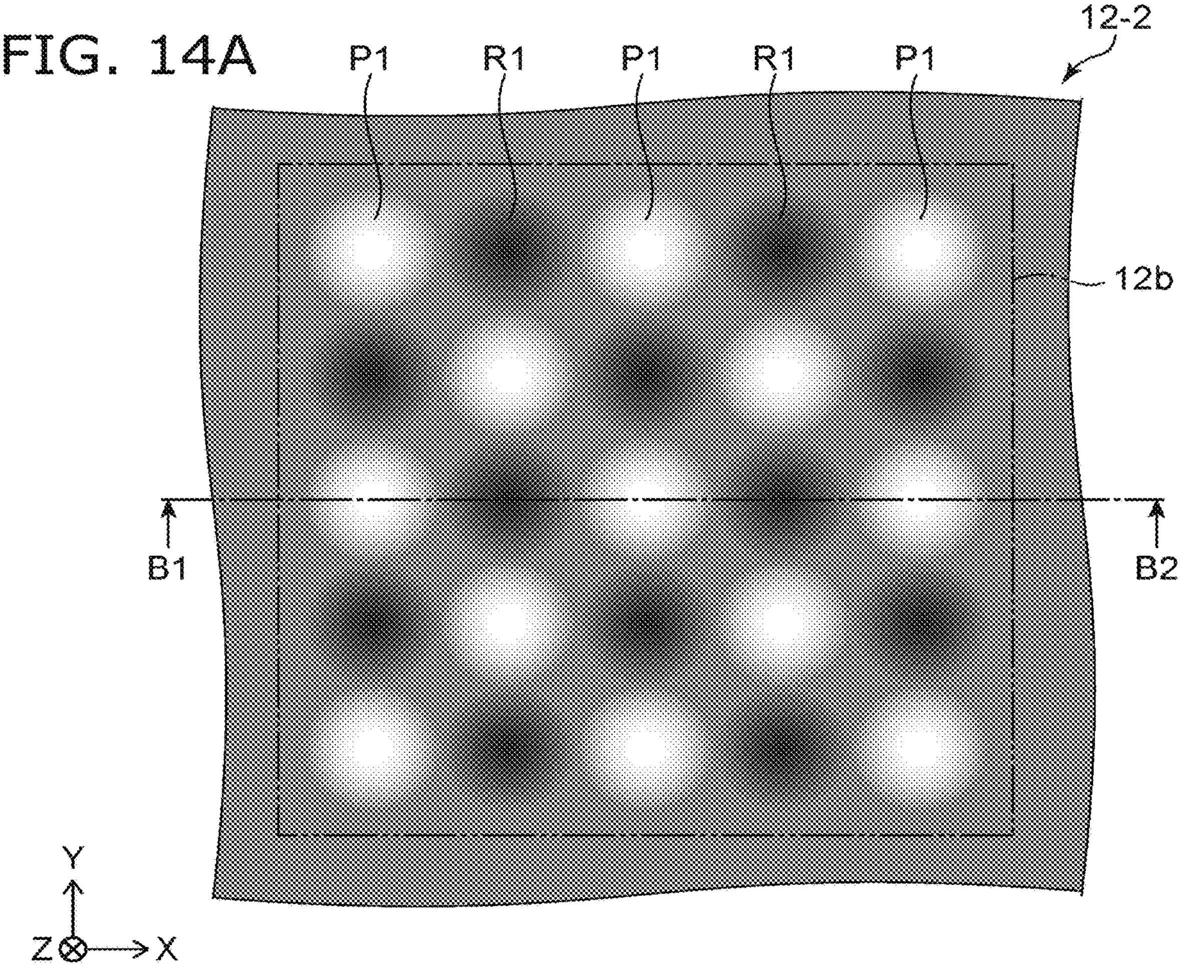
FIG. 14A is a plan view showing another example of the second propagating member.
Figure 14B:
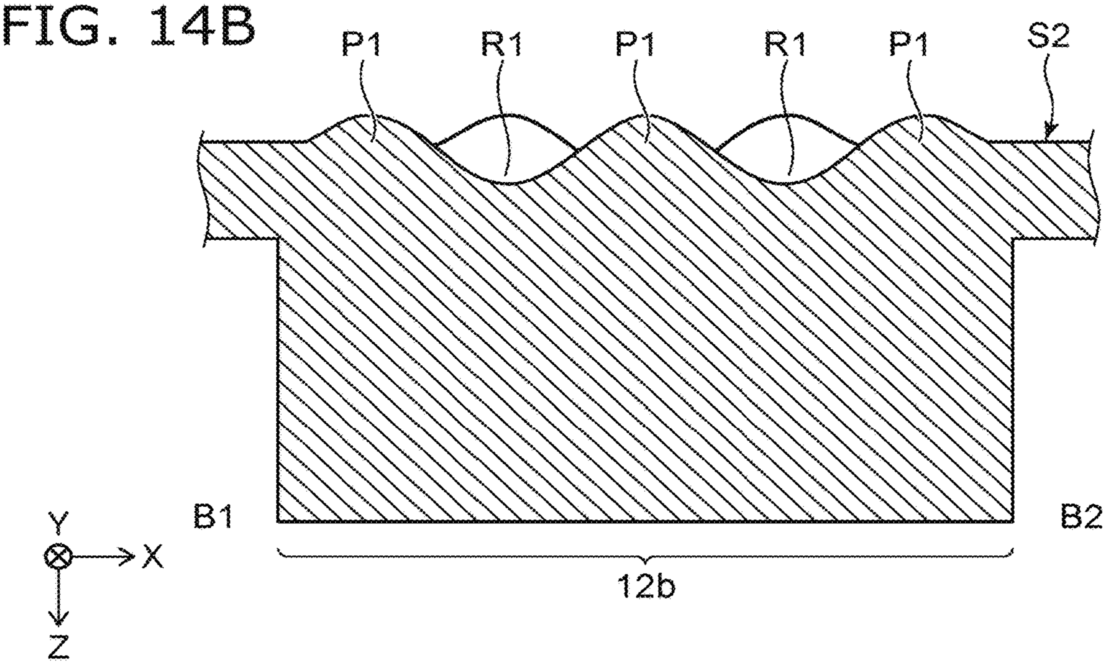
FIG. 14B is a B1-B2 cross-sectional view of FIG. 14A.

In a second propagating member 12-2 shown in FIGS. 14A and 14B, the multiple protrusions P1 are arranged along two directions that cross each other. Multiple recesses R1 are arranged along the two directions. The protrusions P1 and the recesses R1 are alternately arranged in the X-direction and the Y-direction.

According to the second propagating member 12-2, similarly to the second propagating member 12-1, the air between the first surface S1 and the second surface S2 flows outward via the gap between the protrusions P1. The recesses R1 are filled by the protrusions P1 deforming and moving into the recesses R1. Accordingly, the density fluctuation at each point of the second propagating member 12 can be reduced in the state in which the second propagating member 12-2 is mounted. The propagation velocity fluctuation of the ultrasonic wave at each point of the second propagating member 12 can be reduced.

Figure 15A:
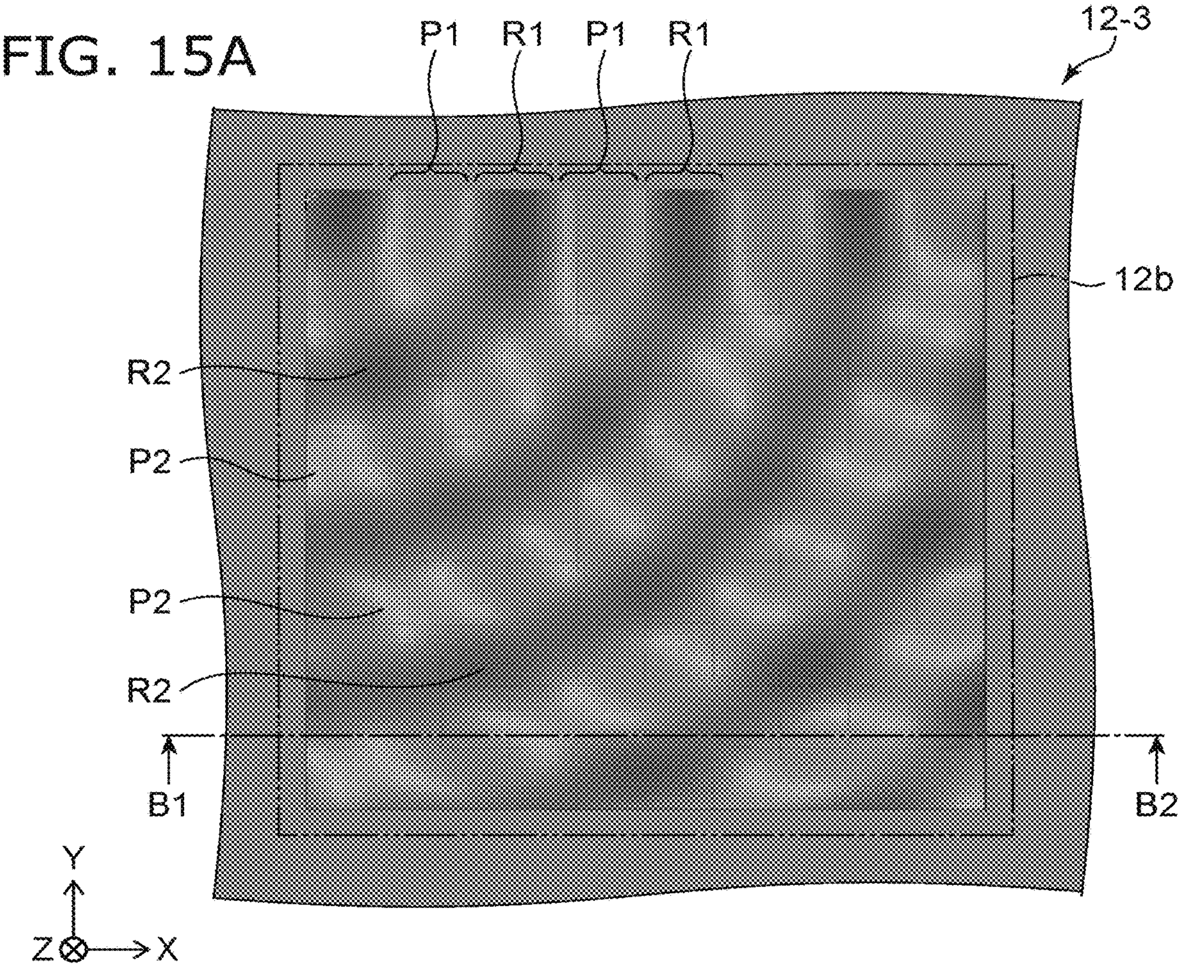
FIG. 15A is a plan view showing another example of the second propagating member.
Figure 15B:
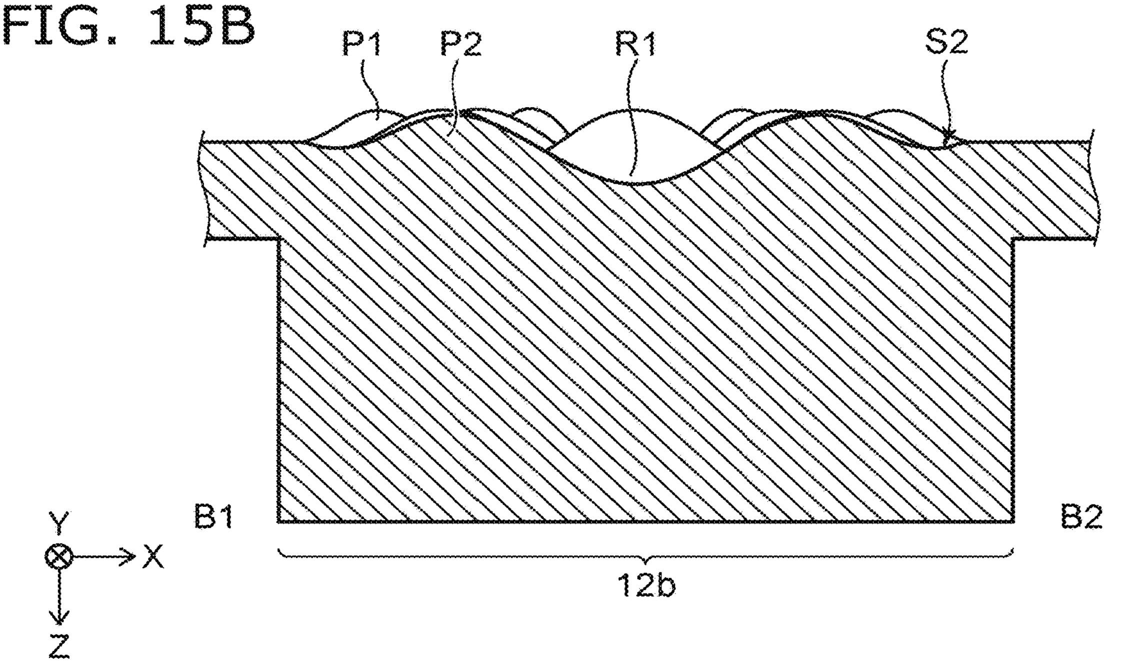
FIG. 15B is a B1-B2 cross-sectional view of FIG. 15A.

A second propagating member 12-3 shown in FIGS. 15A and 15B includes the protrusion P1 curved along the X-Y plane and the recess R1 curved along the X-Y plane. The protrusion P1 protrudes with respect to the flat portion of the second surface S2. The recess R1 is recessed with respect to the flat portion of the second surface S2. The protrusion P1 and the recess R1 are alternately arranged in a direction crossing the direction in which the protrusion P1 and the recess R1 extend.

The protrusion P1 includes multiple protrusions P2 in the direction in which the protrusion P1 extends. The protrusions P2 protrude further than the protrusion P1. The recess R1 includes multiple recesses R2 in the direction in which the recess R1 extends. The recesses R2 are recessed further than the recess R1. The surfaces of the protrusions P1, the protrusions P2, the recesses R1, and the recesses R2 are curved in spherical shapes.

According to the second propagating member 12-3, the protrusions P2 and the protrusions P1 sequentially contact the first surface S1 when the first surface S1 and the second surface S2 contact. The air between the first surface S1 and the second surface S2 flows outward from the first and second propagating members 11 and 12 via the recesses R1. The protrusions P1 and the protrusions P2 deform and fill the recesses R1 and the recesses R2 when the second propagating member 12 is pressed further toward the first propagating member 11. The occurrence of bubbles between the first surface S1 and the second surface S2 can be suppressed thereby. The density fluctuation at each point of the second propagating member 12 can be reduced by the deformed protrusions P1 and P2 moving into the recesses R1 and R2. The propagation velocity fluctuation of the ultrasonic wave at each point of the second propagating member 12 can be reduced.

Figure 16A:
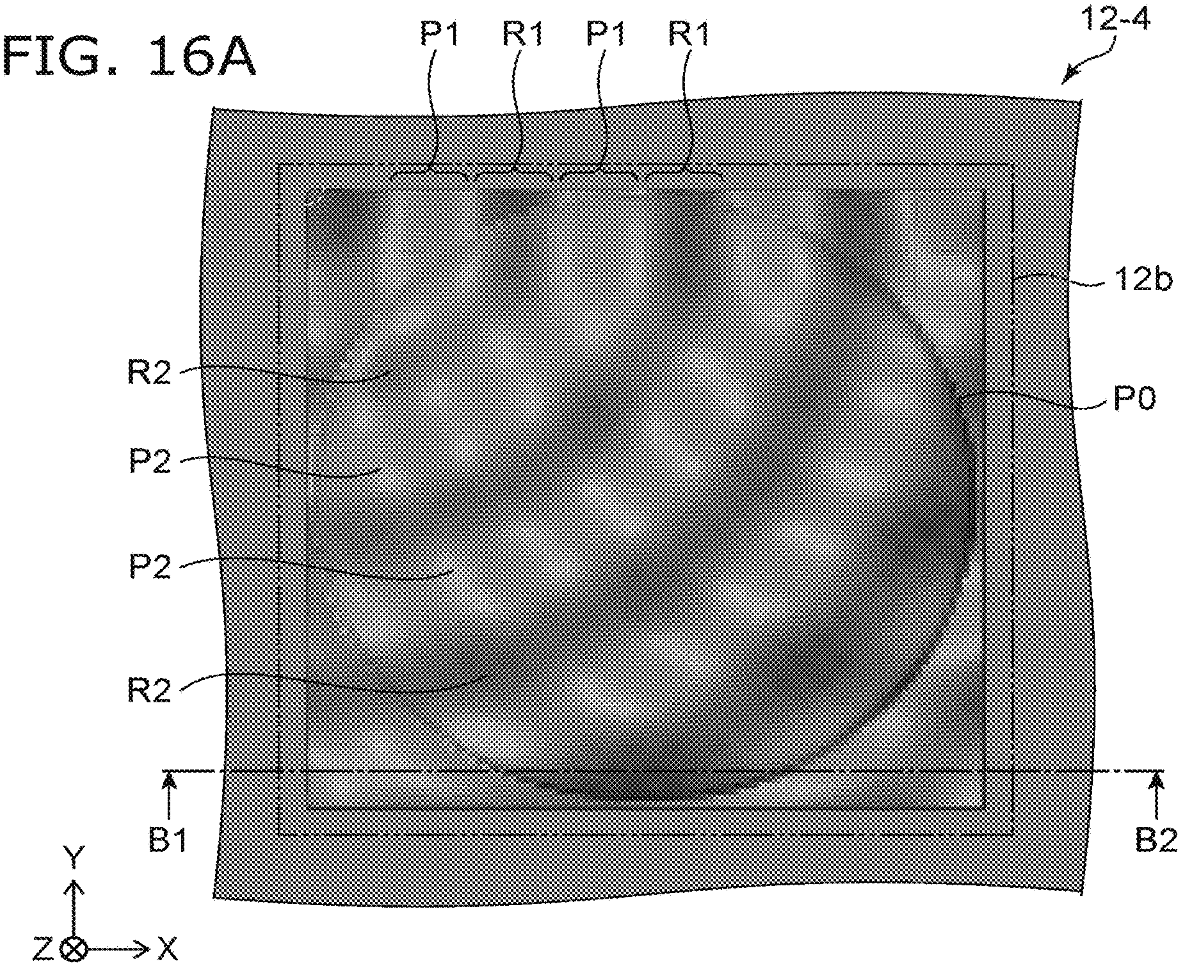
FIG. 16A is a plan view showing another example of the second propagating member.
Figure 16B:
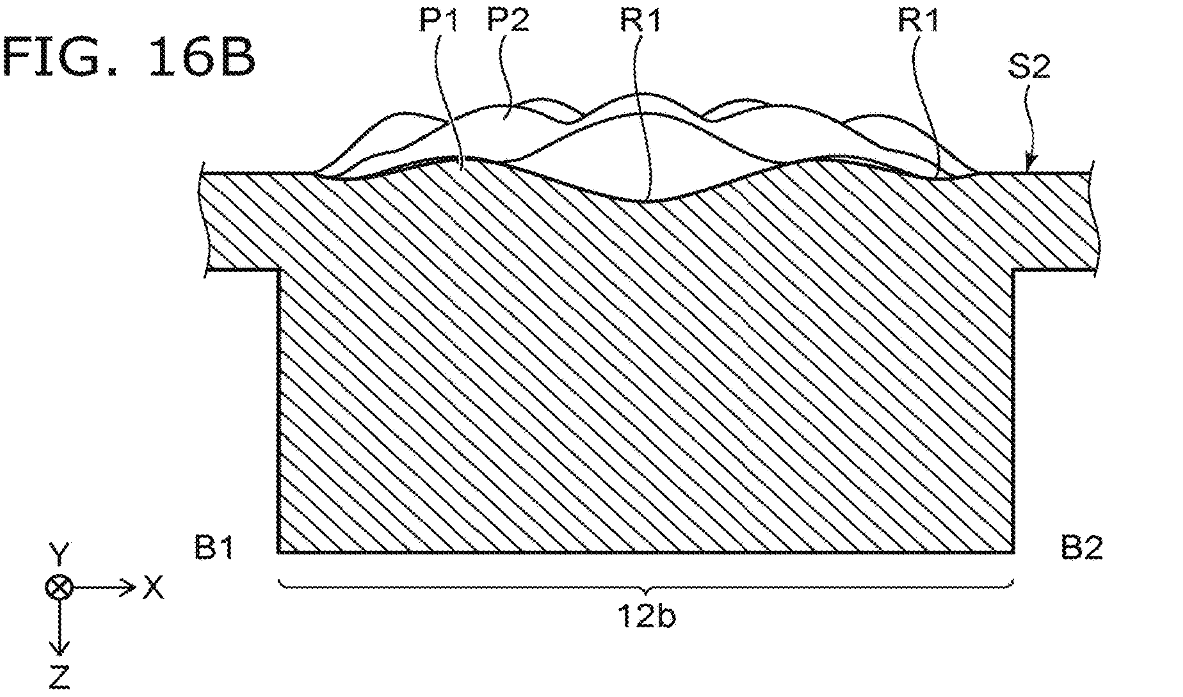
FIG. 16B is a B1-B2 cross-sectional view of FIG. 16A.

Compared to the second propagating member 12-3, a second propagating member 12-4 shown in FIGS. 16A and 16B further includes a protrusion P0. The protrusion P0 protrudes with respect to the flat portion of the second surface S2. The protrusion P0 is spherical. The width of the protrusion P0 is greater than the widths of the protrusion P1, the protrusion P2, the recess R1, and the recess R2. At least a portion of each protrusion P1 and at least a portion of each recess R1 are located on the protrusion P0. The apexes of the protrusions P2 located at the center vicinity of the second region 12*b* are positioned higher than the apexes of the protrusions P2 located at the periphery of the second region 12*b*.

According to the second propagating member 12-4, by providing the protrusion P0, the second surface S2 sequentially contacts the first surface S1 from the center toward the periphery of the second region 12*b* even when the deformation of the second propagating member 12-3 is large due to its own weight. Accordingly, air easily flows outward from the first and second propagating members 11 and 12 when the first surface S1 and the second surface S2 contact. The occurrence of bubbles between the first surface S1 and the second surface S2 can be further suppressed.

Figure 17A:
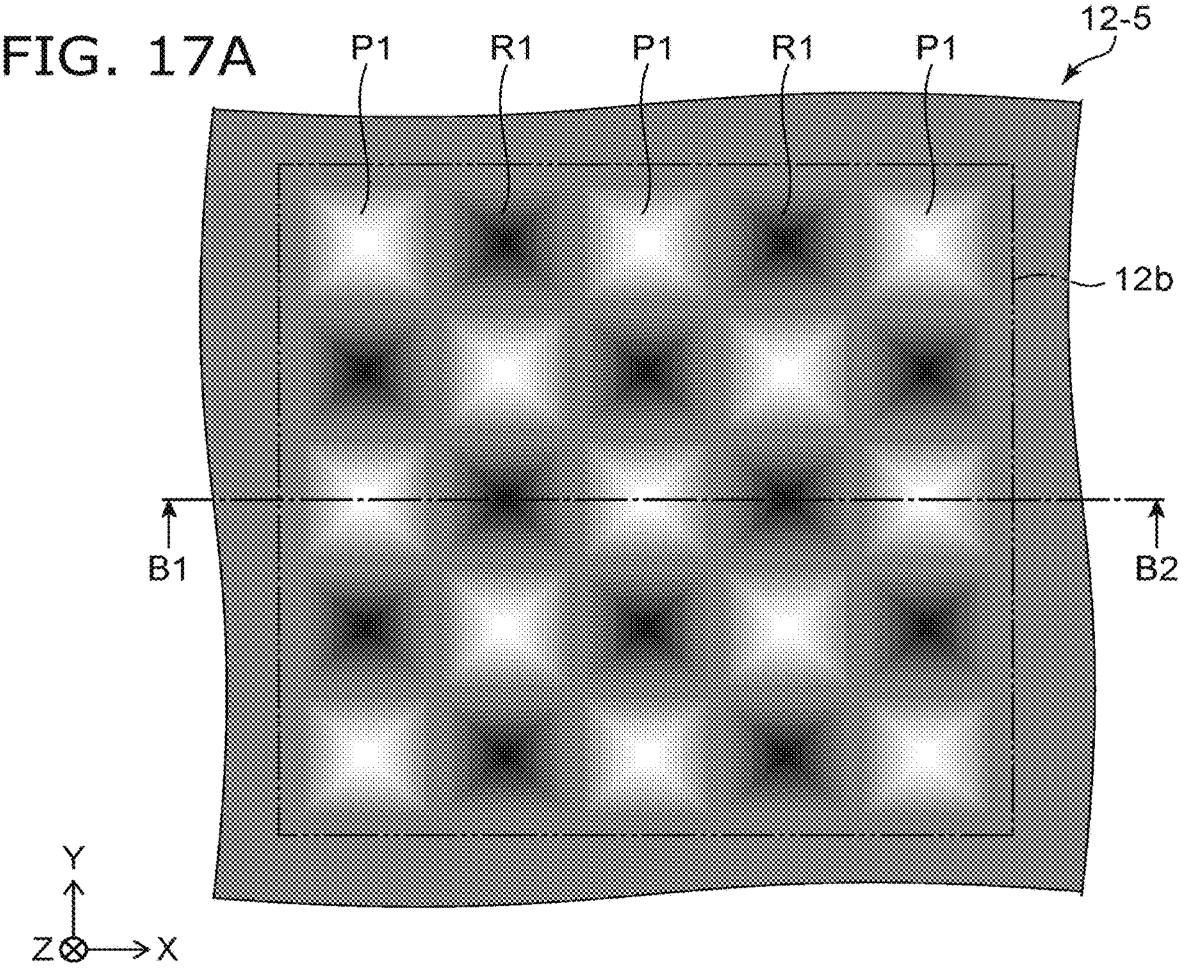
FIG. 17A is a plan view showing another example of the second propagating member.
Figure 17B:
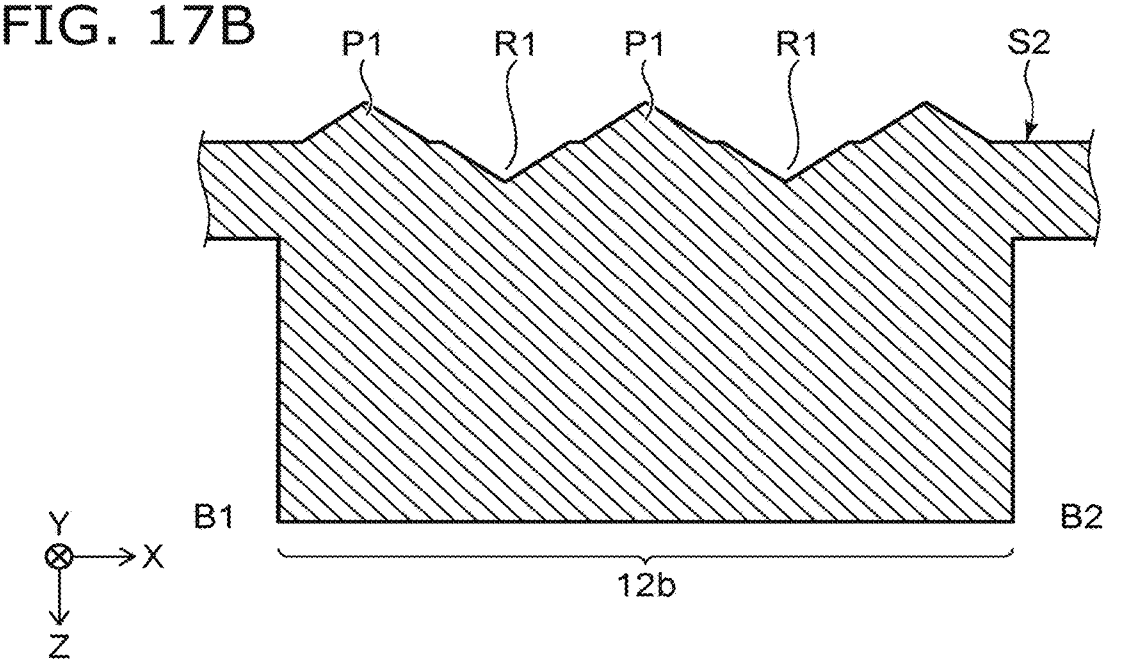
FIG. 17B is a B1-B2 cross-sectional view of FIG. 17A.

A second propagating member 12-5 shown in FIGS. 17A and 178 includes a pyramidal protrusion P1 and a pyramidal recess R1. Multiple protrusions P1 and multiple recesses R1 are arranged along two mutually-orthogonal directions. The protrusion P1 and the recess R1 are alternately arranged in the X-direction and the Y-direction. Each protrusion P1 and each recess R1 is triangular in a cross section along the orthogonal directions.

According to the second propagating member 12-5, similarly to the second propagating member 12-3, the protrusion P1 sequentially contacts the first surface S1 when the first surface S1 and the second surface S2 contact. The occurrence of bubbles between the first surface S1 and the second surface S2 can be suppressed thereby. The density fluctuation at each point of the second propagating member 12 can be reduced by the deformed protrusions P1 moving into the recesses R1.

Figure 18A:
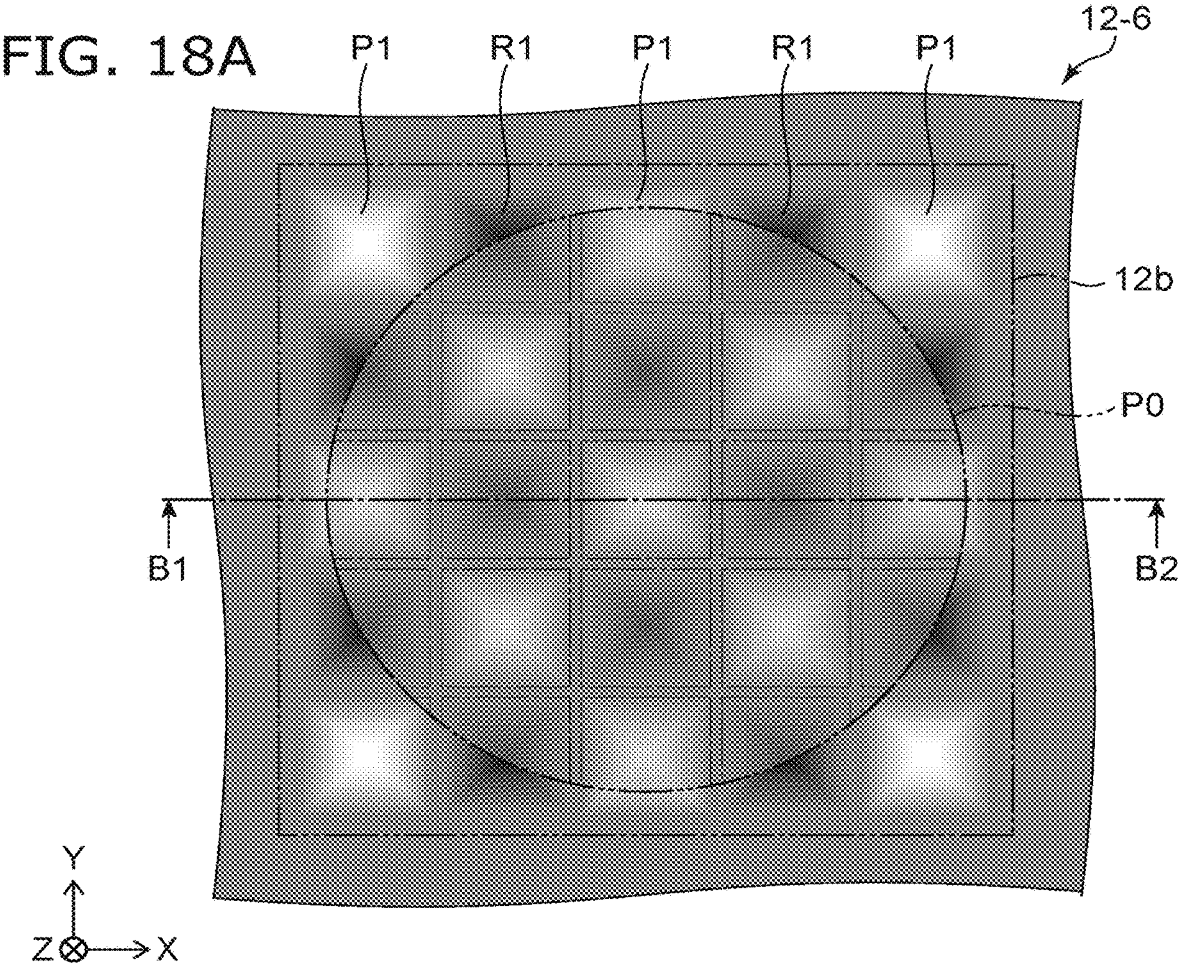
FIG. 18A is a plan view showing another example of the second propagating member.
Figure 18B:
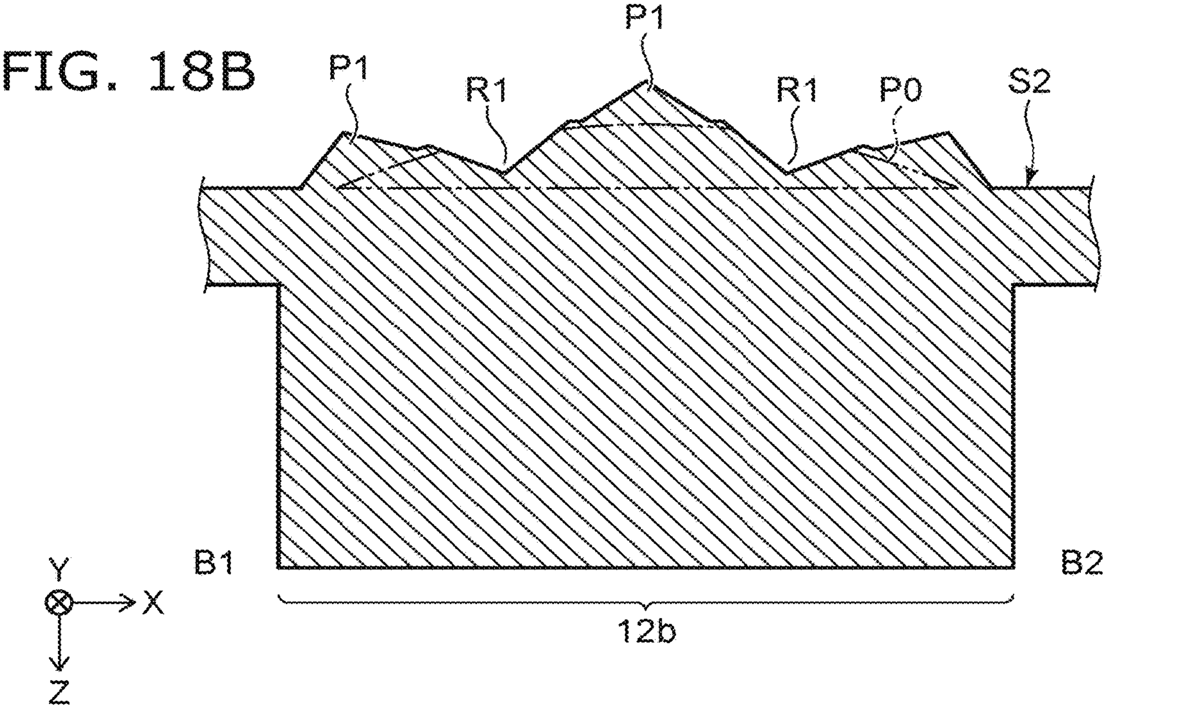
FIG. 18B is a B1-B2 cross-sectional view of FIG. 18A.

Compared to the second propagating member 12-5, a second propagating member 12-6 shown in FIGS. 18A and 18B further includes the protrusion P0. The protrusion P0 is spherical. At least a portion of each protrusion P1 and at least a portion of each recess R1 are located on the protrusion P0. The apexes of the protrusions P1 located at the center vicinity of the second region 12*b* are positioned higher than the apexes of the protrusions P1 located at the periphery of the second region 12*b*.

According to the second propagating member 12-6, similarly to the second propagating member 12-4, the occurrence of bubbles between the first surface S1 and the second surface S2 can be further suppressed by providing the protrusion P0.

To effectively suppress the occurrence of the bubble B in the second propagating members 12-1 to 12-6, it is favorable for the width of the area in which the protrusions and recesses are located to be greater than 0.3 times the width of the second region 12*b*. More favorably, the width of the area is greater than 0.5 times the width of the second region 12*b*.

Figure 19A:
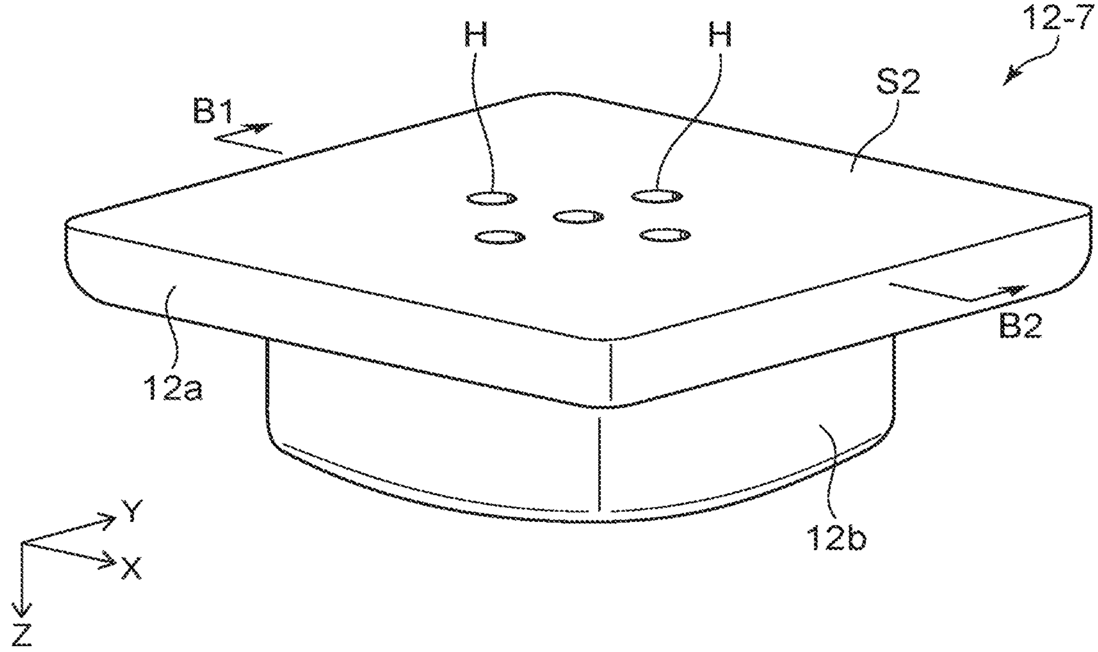
FIG. 19A is a perspective view showing another example of the second propagating member.
Figure 19B:
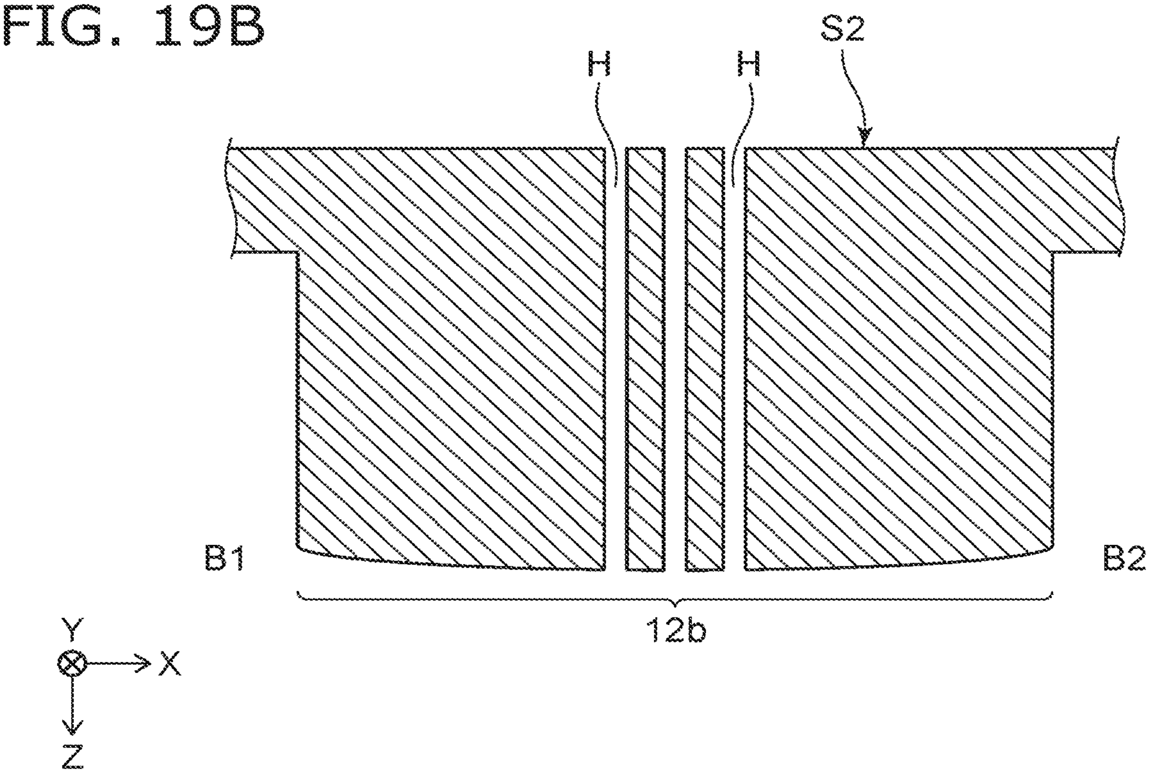
FIG. 19B is a B1-B2 cross-sectional view of FIG. 19A.

FIG. 19A is a perspective view showing another example of the second propagating member. FIG. 19B is a B1-B2 cross-sectional view of FIG. 19A.

The second propagating member 12-7 shown in FIGS. 19A and 19B includes a hole H instead of a protrusion. The hole H extends through the second region 12*b* in the Z-direction. Multiple holes H may be provided.

The air that is between the first surface S1 and the second surface S2 is discharged via the hole H when the second propagating member 12-7 is pressed onto the first propagating member 11. According to the second propagating member 12-6, similarly to when the protrusion is included, the occurrence of bubbles between the first surface S1 and the second surface S2 can be suppressed.

The hole H may be provided in any of the second propagating members 12-1 to 12-6. The occurrence of bubbles between the first surface S1 and the second surface S2 can be effectively suppressed by combining the protrusion and the hole H.

Figure 20A:
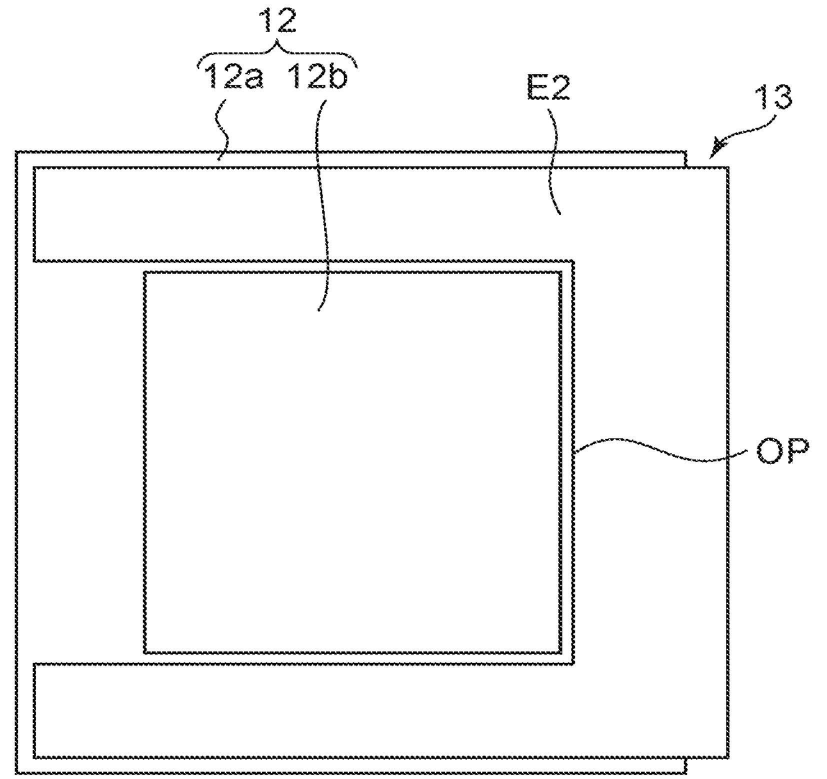
FIGS. 20A and 20B are bottom views showing portions of detection devices according to the embodiment.
Figure 20B:
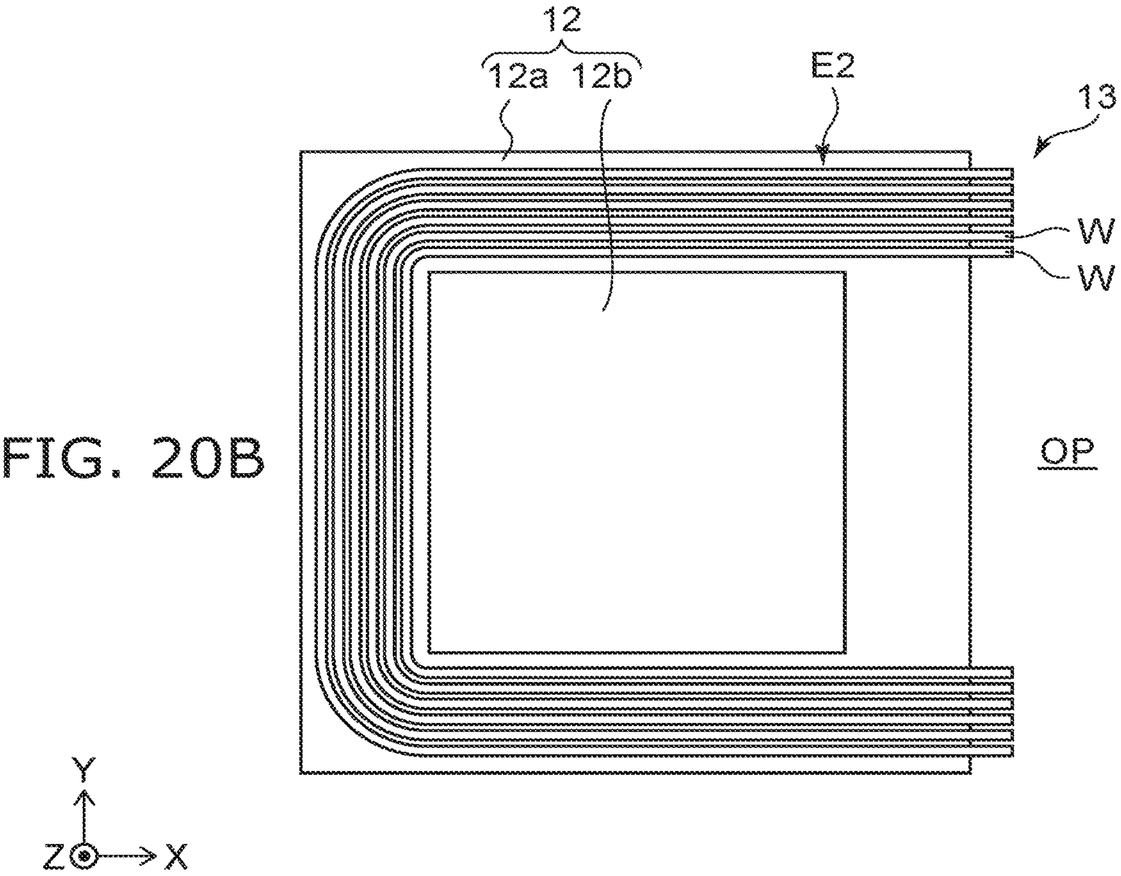

FIGS. 20A and 20B are bottom views showing portions of detection devices according to the embodiment.

As shown in FIG. 20A, the opening OP may extend in one direction in a slit configuration. As shown in FIG. 20B, the plate member 13*a* may include multiple wires W. The opening OP is formed at a position at which the wire W is not located.

The structure of the detector 15, a detection system that includes the detection device 10, an inspection that uses the ultrasonic wave, and the replacement of the second propagating member 12 will now be described in detail.

Specific Structure of Detector

Figure 21:
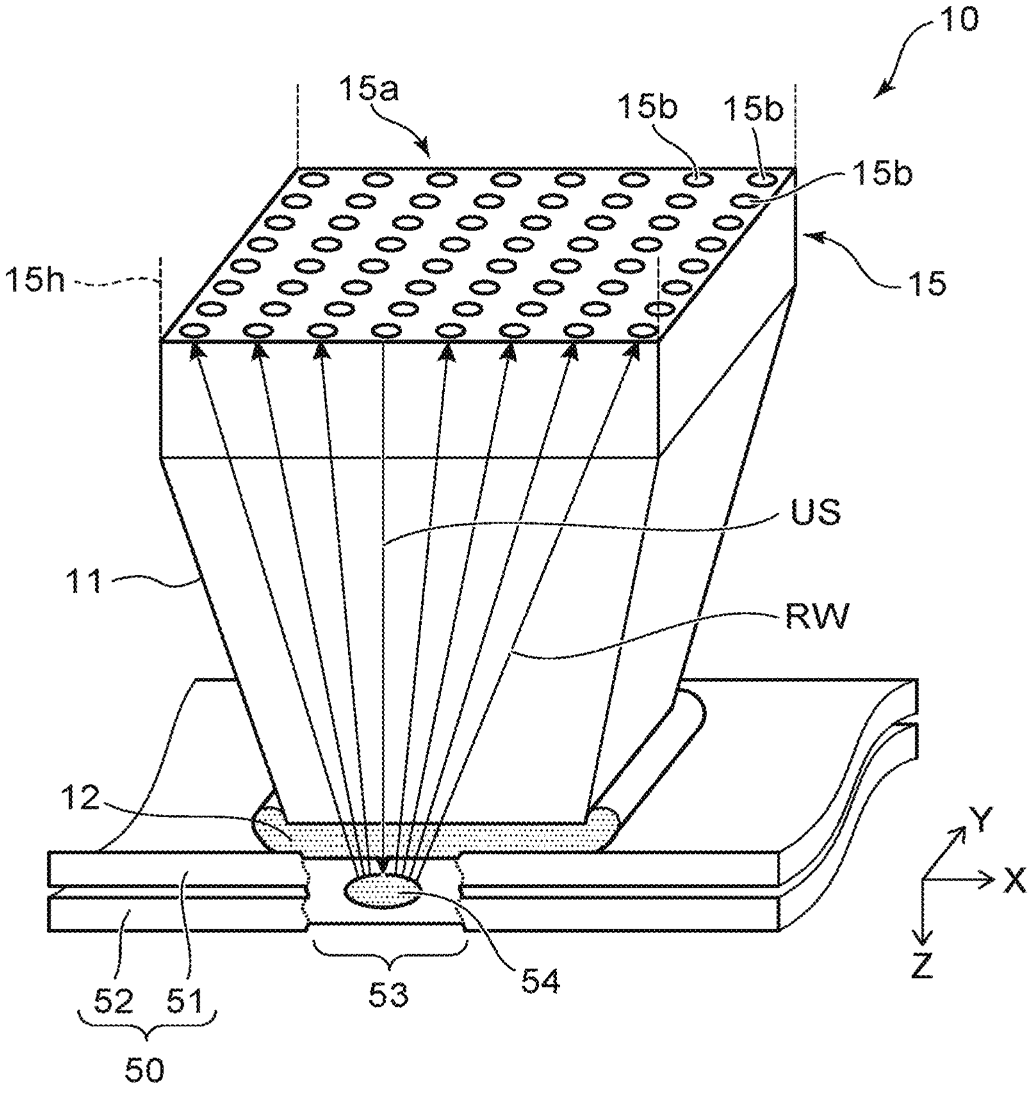
FIG. 21 is a schematic view showing the tip of the detection device according to the embodiment.

FIG. 21 is a schematic view showing the tip of the detection device according to the embodiment. The fixture 13 is not illustrated in FIG. 21.

As shown in FIG. 21, the element array 15*a* is located inside the detector 15. The element array 15*a* includes multiple detection elements 15*b*. The detection element 15*b* is, for example, a transducer and emits an ultrasonic wave of a frequency of not less than 1 MHz and not more than 100 MHz. The multiple detection elements 15*b* are arranged along the X-direction and the Y-direction.

The data of the reflected waves obtained by the probing can be used in the inspection of the object. FIG. 21 illustrates the inspection of a joined body 50. In the joined body 50, a metal member 51 (a first member) and a metal member 52 (a second member) are joined at a weld portion 53. The weld portion 53 is formed by resistance spot welding. A solidified portion 54 is formed at the weld portion 53 by a portion of the metal member 51 and a portion of the metal member 52 melting, mixing, and solidifying. Each detection element

15*b* transmits an ultrasonic wave US toward the joined body 50 and receives a reflected wave RW from the joined body 50.

As one specific example as shown in FIG. 21, one detection element 15*b* transmits the ultrasonic wave US toward the weld portion 53. A portion of the ultrasonic wave US is reflected by the upper surface or the lower surface of the joined body 50, etc. The multiple detection elements 15*b* each receive (detect) the reflected waves RW. The detection elements 15*b* sequentially transmit the ultrasonic wave US; and the reflected waves RW are detected by the multiple detection elements 15*b*. The detection result of the reflected waves indicating the state of the weld portion 53 vicinity is obtained thereby.

Figure 22:
FIG. 22 is a schematic view illustrating a three-dimensional detection result obtained by the probing.

FIG. 22 is a schematic view illustrating a three-dimensional detection result obtained by the probing.

In the probing as described above, the detection elements sequentially transmit ultrasonic waves; and the multiple detection elements 15*b* detect the reflected waves. In the specific example shown in FIG. 22, sixty-four, i.e., 8×8, detection elements 15*b* are included. In such a case, the sixty-four detection elements 15*b* sequentially transmit ultrasonic waves. One detection element 15*b* repeatedly detects the reflected wave 64 times. The detection result of the Z-direction reflected wave intensity distribution is output 64 times from one detection element 15*b*. The sixty-four reflected wave intensity distributions output from the one detection element 15*b* are summed. The summed intensity distribution is the intensity distribution for one probing at the coordinate at which the one detection element 15*b* is located. Similar processing is performed for the detection results of the sixty-four detection elements 15*b*. Thereby, the Z-direction reflected wave intensity distribution is generated at each point in the X-Y plane. FIG. 22 shows an image of the three-dimensional intensity distribution. The portions of FIG. 22 at which the luminance is high are portions at which the reflected wave intensity of the ultrasonic wave is large. The three-dimensional intensity distribution data is used in the inspection.

Detection System

Figure 23:
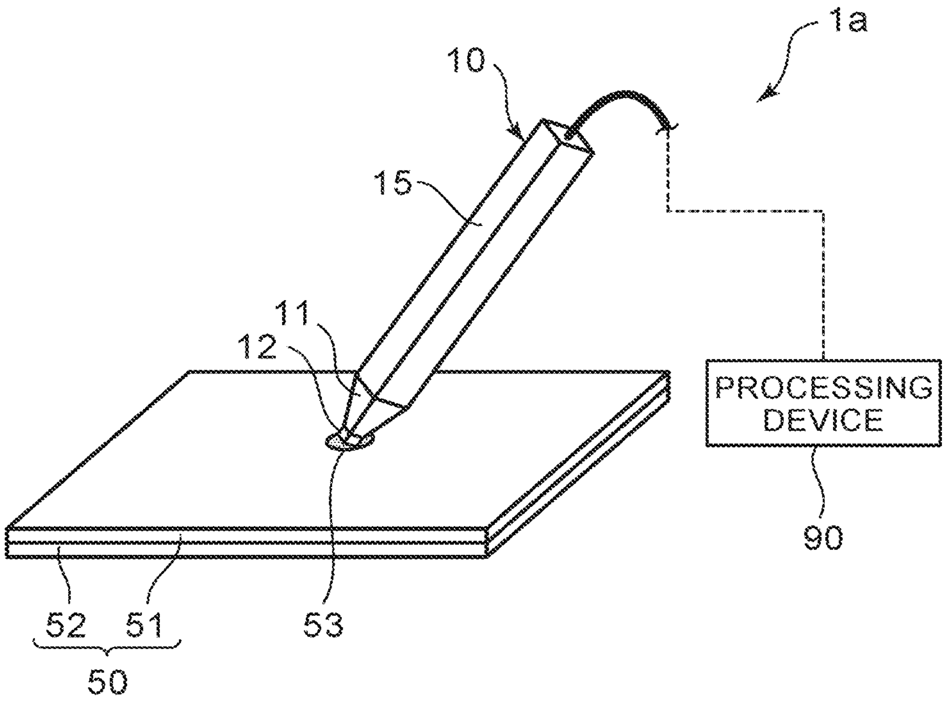
FIG. 23 is a schematic view showing a detection system according to the embodiment, and a fixture 13 is not illustrated in FIG. 23.

FIG. 23 is a schematic view showing a detection system according to the embodiment. The fixture 13 is not illustrated in FIG. 23.

The detection system 1*a* includes the detection device 10 and a processing device 90. In the detection system 1*a*, the detection device 10 has a shape that can be gripped by the hand of a human. The inspector that grips the detection device 10 inspects the weld portion 53 by causing the second propagating member 12 at the tip of the detection device 10 to contact the weld portion 53. At this time, the inspector presses the second propagating member 12 toward the joined body 50 so that the second propagating member 12 deforms along the shape of the weld portion 53. For example, the inspector presses the second propagating member 12 toward the joined body 50 until the fixture 13 contacts the joined body 50. The inspector performs the probing in a state in which the detection device 10 contacts the weld portion 53.

The processing device 90 controls the element array 15*a* of the detection device 10. For example, the detection device and the processing device 90 are connected by a cable. In the probing, an electrical signal is transmitted to each detection element 15*b* from the processing device 90; and an ultrasonic wave is transmitted from each detection element 15*b*. Also, the detection elements 15*b* each output electrical signals according to the detection of the reflected waves. The magnitude of the electrical signal corresponds to the intensity of the reflected wave. The detection elements 15*b* each transmit, to the processing device 90, intensity data of the intensities of the detected reflected waves. The processing device 90 performs various processing based on the intensity data.

Figure 24:
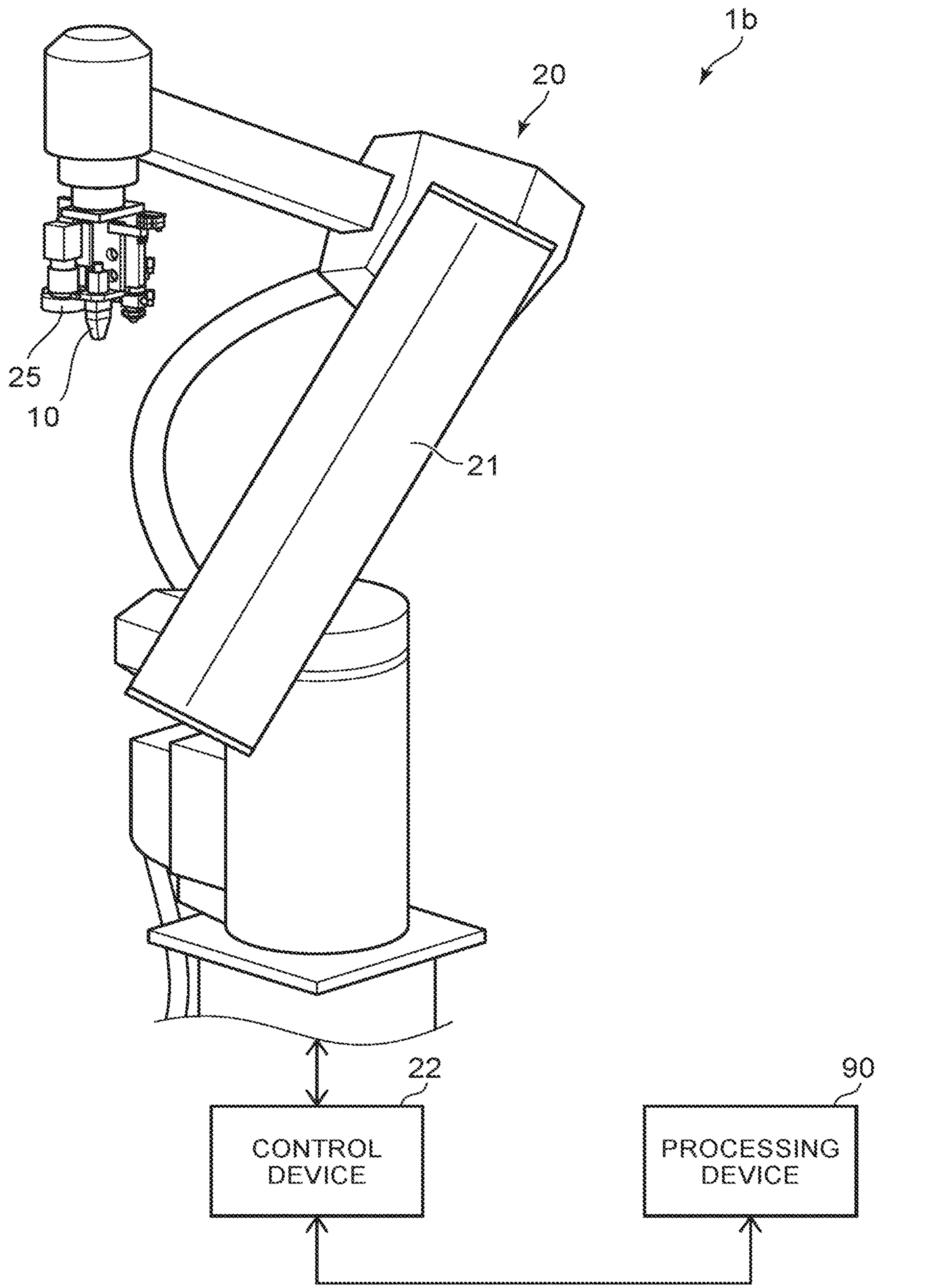
FIG. 24 is a schematic view showing another detection system according to the embodiment.

FIG. 24 is a schematic view showing another detection system according to the embodiment.

The detection system 1*b* shown in FIG. 24 includes a robot and the processing device 90. The robot 20 includes a manipulator 21 and a control device 22.

In the example shown in FIG. 24, the manipulator 21 is vertical articulated. The manipulator 21 may be a horizontal articulated or parallel link type. The control device 22 is connected with the manipulator 21 and controls the operation of the manipulator 21. The control device 22 is a so-called robot controller.

As shown in FIG. 24, the detection device 10 is located at the distal end of the manipulator 21. An imaging device 25 also may be located at the distal end of the manipulator 21. The imaging device 25 acquires an image by imaging the welded member. The processing device 90 extracts a weld mark from the obtained image, and detects the position of the weld portion 53. The control device 22 operates the manipulator 21 so that the tip of the detection device 10 contacts the weld portion 53.

The processing device 90 may indirectly control the detection device 10 via the control device 22 or may directly control the detection device 10. The control device 22 and the processing device 90 may be connected via wireless communication or a network.

Inspection

Figure 25A:
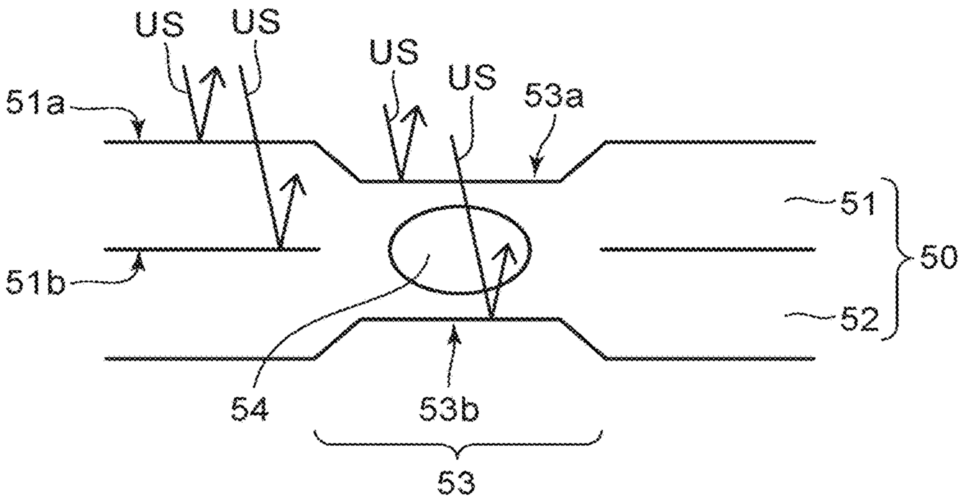
FIGS. 25A to 25C are schematic views for describing an inspection method that uses the detection device according to the embodiment.
Figure 25B:
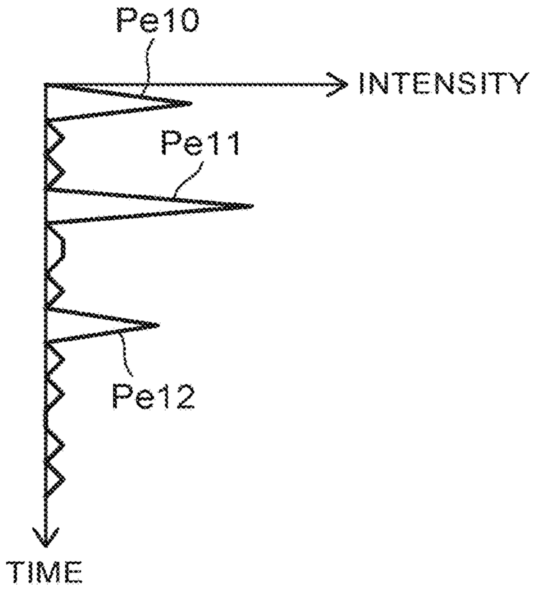
Figure 25C:
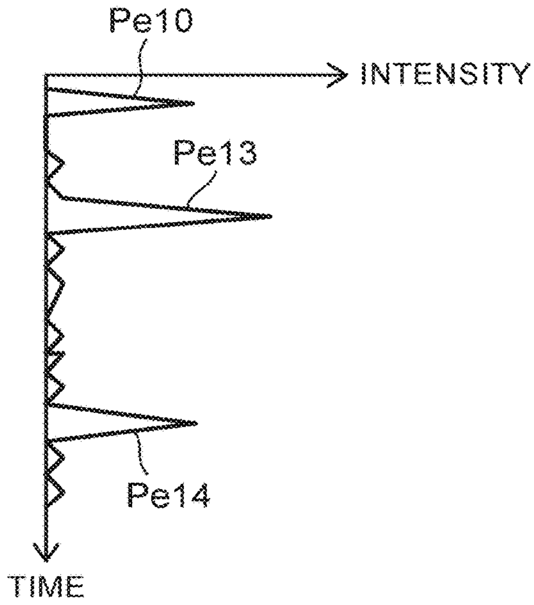

FIGS. 25A to 25C are schematic views for describing an inspection method that uses the detection device according to the embodiment.

The detection result (the intensity data) of the reflected wave obtained by the detection system 1*a* or 1*b* shown in FIG. 23 or FIG. 24 is used in the inspection of the weld portion 53. The processing device 90 may use the intensity data to perform the following processing.

As shown in FIG. 25A, a portion of the ultrasonic wave US is reflected by an upper surface 51*a* of the metal member 51 or an upper surface 53*a* of the weld portion 53. The other portion of the ultrasonic wave US is incident on the joined body 50 and is reflected by a lower surface 51*b* of the metal member 51 or a lower surface 53*b* of the weld portion 53.

The Z-direction positions of the upper surface 51*a*, the lower surface 51*b*, the upper surface 53*a*, and the lower surface 53*b* are different from each other. In other words, the Z-direction distances between the detection element 15*b* and these surfaces are different from each other. The detection element 15*b* detects peaks of the reflected wave intensities when detecting the reflected waves from these surfaces. Which surface reflected the ultrasonic wave US can be checked by calculating the time until each peak is detected after transmitting the ultrasonic wave US.

FIGS. 25B and 25C are graphs illustrating the relationship between the time after the ultrasonic wave US is transmitted and the intensity of the reflected wave RW. Here, the intensity of the reflected wave RW is expressed as an absolute value. The graph of FIG. 25B illustrates the detection result of the reflected waves RW from the upper surface 51*a* and the lower surface 51*b* of the metal member 51. The graph of FIG. 25C illustrates the detection result of the reflected waves RW from the upper surface 53*a* and the lower surface 53*b* of the weld portion 53. In the graphs of FIGS. 25B and 25C, a peak Pen is based on the reflected wave RW from the first and second propagating members 11 and 12. A peak Pe11 is based on the reflected wave RW from the upper surface 51*a*. A peak Pe12 is based on the reflected wave RW from the lower surface 51*b*. Times from the transmission of the ultrasonic wave US until the peak Pe11 and the peak Pe12 are detected correspond respectively to the Z-direction positions of the upper surface 51*a* and the lower surface 51*b* of the metal member 51.

Similarly, a peak Pe13 is based on the reflected wave RW from the upper surface 53*a*. A peak Pe14 is based on the reflected wave RW from the lower surface 53*b*. The time from the transmission of the ultrasonic wave US until the peak Pe13 and the peak Pe14 are detected correspond respectively to the Z-direction positions of the upper surface 53*a* and the lower surface 53*b* of the weld portion 53.

The processing device 90 determines whether or not the peak Pe12 exists in the Z-direction reflected wave intensity distribution at points in the first surface. The first surface is parallel to the X-direction and the Y-direction. As one specific example, the processing device 90 detects a peak in a prescribed range in the Z-direction in which the peak Pe12 may be detected. The prescribed range is preset according to the Z-direction length of the first propagating member 11, the distance between the first propagating member 11 and the metal member 51, etc. The processing device 90 compares the peak intensity with a prescribed threshold. When the peak is greater than the threshold, the processing device 90 determines that the peak is the peak Pe12. The existence of the peak Pe12 indicates that the lower surface 51*b* exists at the position of the peak and that the metal member 51 and the metal member 52 are not joined. The processing device 90 determines that the points at which the peak Pe12 is detected are not joined. The processing device 90 sequentially determines whether or not each of multiple points in the first surface are joined. A cluster of points determined to be joined corresponds to the weld portion 53. For example, the inspection checks whether or not the weld portion 53 is formed. In the inspection, the diameter of the weld portion 53 may be calculated and used to determine whether or not the diameter is sufficient.

The intensity of the reflected wave may be expressed in any form. For example, the reflected wave intensity that is output from the detection element 15*b* includes positive values and negative values according to the phase. Various processing may be performed based on the reflected wave intensity including positive values and negative values. The reflected wave intensity that includes positive values and negative values may be converted into absolute values. The average value of the reflected wave intensities may be subtracted from the reflected wave intensity at each time. Or, the weighted average value, the weighted moving average value, etc., of the reflected wave intensities may be subtracted from the reflected wave intensity at each time. The various processing described in the application can be performed even when the results of such processing applied to the reflected wave intensity are used.

Second Propagating Member Replacement

The second propagating member 12 may be automatically replaced. Units for automatically replacing the second propagating member 12 will now be described.

Figure 26:
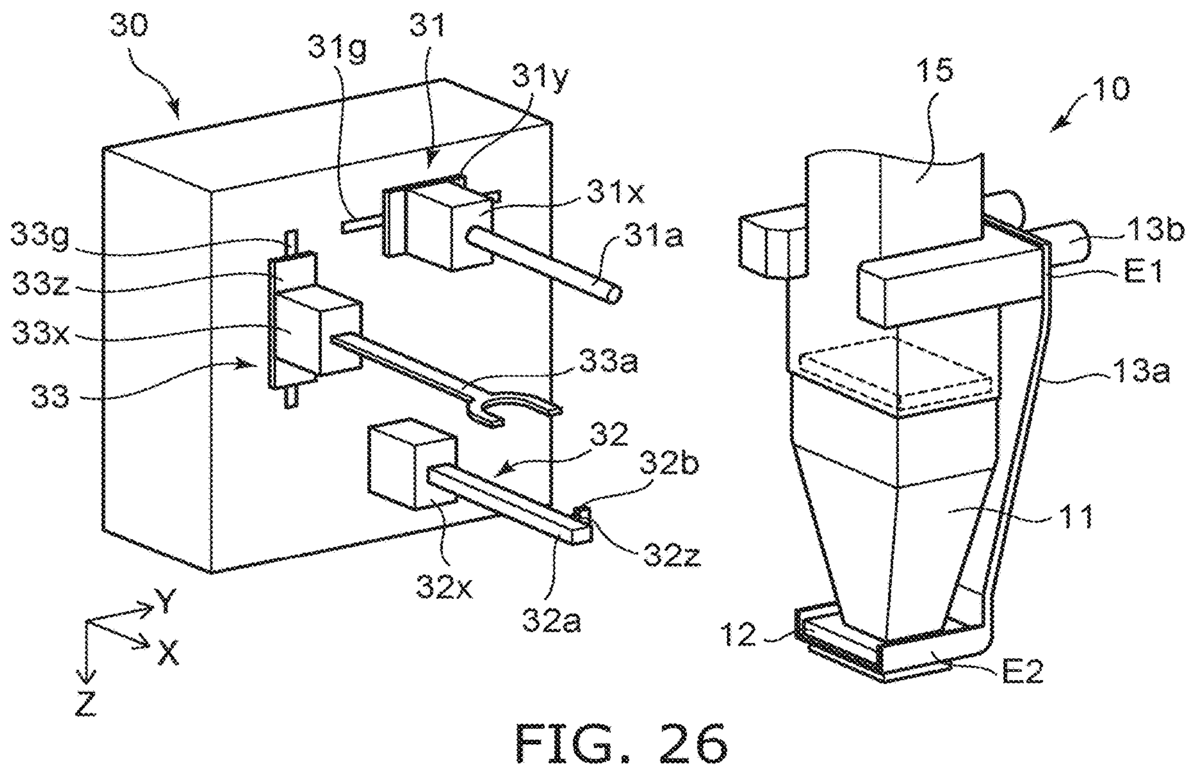
FIG. 26 is a schematic view illustrating the units for replacing a second propagating member 12.

FIG. 26 is a schematic view illustrating the units for replacing the second propagating member 12.

The detection system 1*a* or 1*b* may include a release unit 31, an ejector unit 32, and a transfer unit 33 shown in FIG. 26.

The release unit 31 includes a bar 31*a*, a driver 31*x*, and a driver 31*y*. The bar 31*a* is a member extending in a direction crossing the Z-direction. The driver 31*x* moves the bar 31*a* in the X-direction. The driver 31*y* moves the bar 31*a* and the driver 31*x* in the Y-direction along a guide 31*g*. The bar 31*a* latches on the plate member 13*a* and deforms the plate member 13*a*. The fixation of the second propagating member 12 by the fixture 13 is released thereby. The specific shape of the bar 31*a* is arbitrary as long as the bar 31*a* extends in one direction. For example, the tip of the bar 31*a* may be curved and may be hook-shaped.

The ejector unit 32 includes a bar 32*a*, an ejection part 32*b*, a driver 32*x*, and a driver 32*z*. The bar 32*a* is a member that extends in a direction crossing the Z-direction. The ejection part 32*b* is mounted to the tip of the bar 32*a* via the driver 32*z*. The driver 32*z* moves the ejection part 32*b* in the Z-direction. The driver 32*x* moves the bar 32*a* in the X-direction.

The ejection part 32*b* moves in the Z-direction in a state in which the ejection part 32*b* is positioned below the second propagating member 12 placed in the second end part E2. The ejection part 32*b* contacts the second propagating member 12. The second propagating member 12 is ejected by the ejection part 32*b* and is lifted from the second end part E2. Accordingly, the second propagating member 12 can be detached from the second end part E2.

The transfer unit 33 includes a holding part 33*a*, a driver 33*x*, and a driver 33*z*. The holding part 33*a* extends in a direction crossing the Z-direction. The tip of the holding part 33*a* has a structure that can hold the second propagating member 12. In the example of FIG. 26, a tab is provided in the tip of the holding part 33*a*. The holding part 33*a* holds the second propagating member 12 by the second propagating member 12 catching on the tab. An intake port may be provided in the tip of the holding part 33*a*; and the second propagating member 12 may be held by vacuum-gripping.

The driver 33*x* moves the holding part 33*a* in the X-direction. The driver 33*z* moves the driver 33*x* and the holding part 33*a* in the Z-direction. The transfer unit 33 holds and transfers the second propagating member 12. The transfer unit 33 transfers one new second propagating member 12 to the second end part E2 from a loading location at which the new second propagating member 12 is placed.

For example, the drivers 31*x*, 32*x*, and 33*x* include air cylinders. The drivers 31*y*, 32*z*, and 33*z* include motors.

For example, the release unit 31, the ejector unit 32, and the transfer unit 33 may be configured as one replacement device as shown in FIG. 26. Or, the release unit 31, the ejector unit 32, and the transfer unit 33 each may be provided independently and separately. In such a case, the movement directions of the bar 31*a*, the bar 32*a*, and the holding part 33*a* may be different from each other.

FIGS. 27A to 27D and FIGS. 28A to 28D are schematic views illustrating operations of the units for replacing the second propagating member.

As shown in FIG. 27A, the bar 31*a* of the release unit 31 is inserted between the first propagating member 11 and the plate member 13*a*. As shown in FIG. 27B, the release unit 31 moves the bar 31*a* in a direction away from the first propagating member 11. The plate member 13*a* is deformed thereby, and the fixation of the second propagating member 12 is released. The second propagating member 12 is moved away from the first propagating member 11. The ejector unit 32 positions the tip of the ejection part 32*b* under the second end part E2 and lifts. Thereby, as shown in FIG. 27C, the second propagating member 12 is ejected from the second end part E2.

As shown in FIG. 27D, the transfer unit 33 clamps the second region 12*b* with the holding part 33*a* and holds the ejected second propagating member 12. When the opening OP of the second end part E2 is slit-shaped as shown in FIG. 6A, the ejection amount of the second propagating member 12 by the ejector unit 32 may be less than that of the example shown in FIG. 27B. This is because the second propagating member 12 is detached from the second end part E2 by sliding the second propagating member 12 along the direction in which the opening OP extends.

As shown in FIG. 28A, the transfer unit 33 transfers the second propagating member 12 that is held to another location. As shown in FIG. 28B, the transfer unit 33 transfers another new second propagating member 12 above the second end part E2. The new second propagating member 12 is placed on the ejection part 32*b*. As shown in FIG. 28C, the ejector unit 32 lowers the ejection part 32*b* and places the second propagating member 12 on the second end part E2. As shown in FIG. 28D, the release unit 31 causes the bar 31*a* to approach the first propagating member 11 and releases the deformation of the plate member 13*a*. The second propagating member 12 is replaced by these operations.

The processing device 90 controls the operations of the release unit 31, the ejector unit 32, and the transfer unit 33. For example, the processing device 90 causes the units to replace the second propagating member 12 when the second propagating member 12 is determined to be abnormal. A more appropriate reflected wave detection result can be obtained thereby.

Modification

Figure 29A:
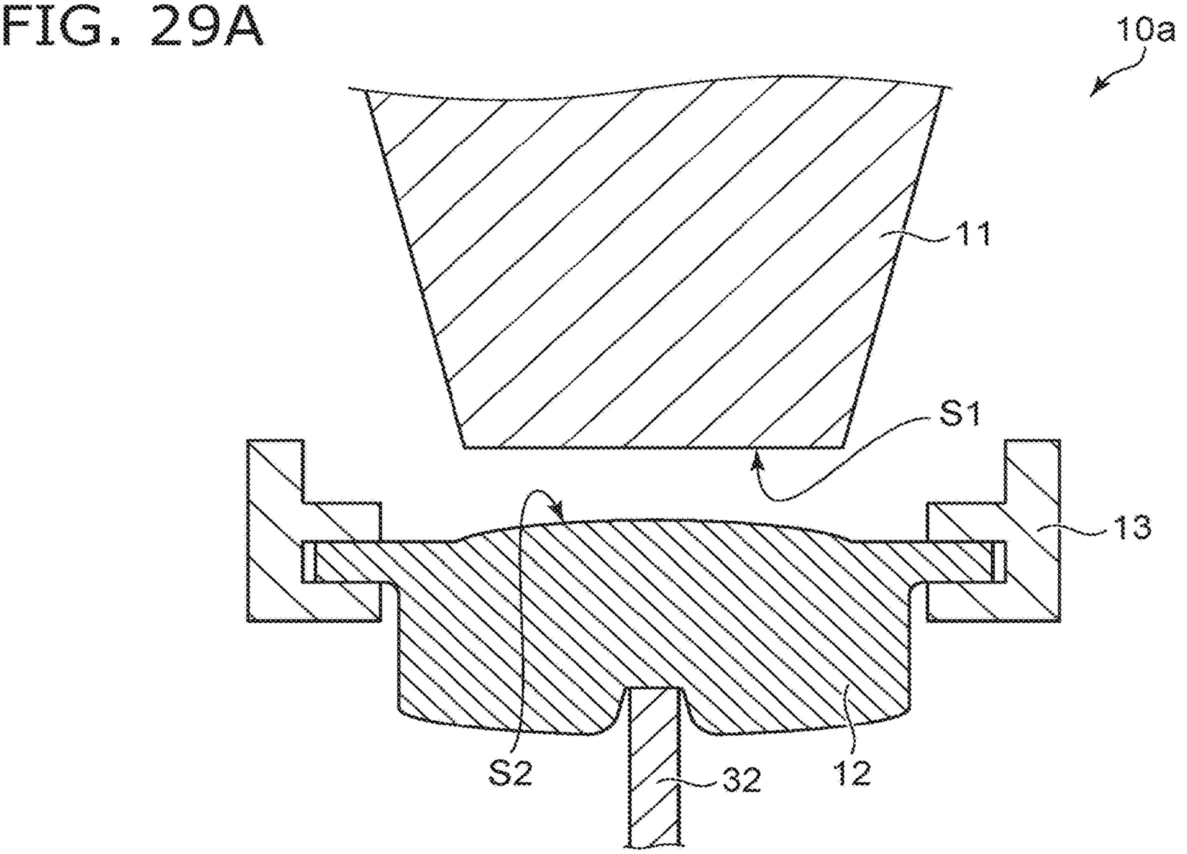
FIGS. 29A and 29B are cross-sectional views showing a detection device according to a modification of the embodiment.
Figure 29B:
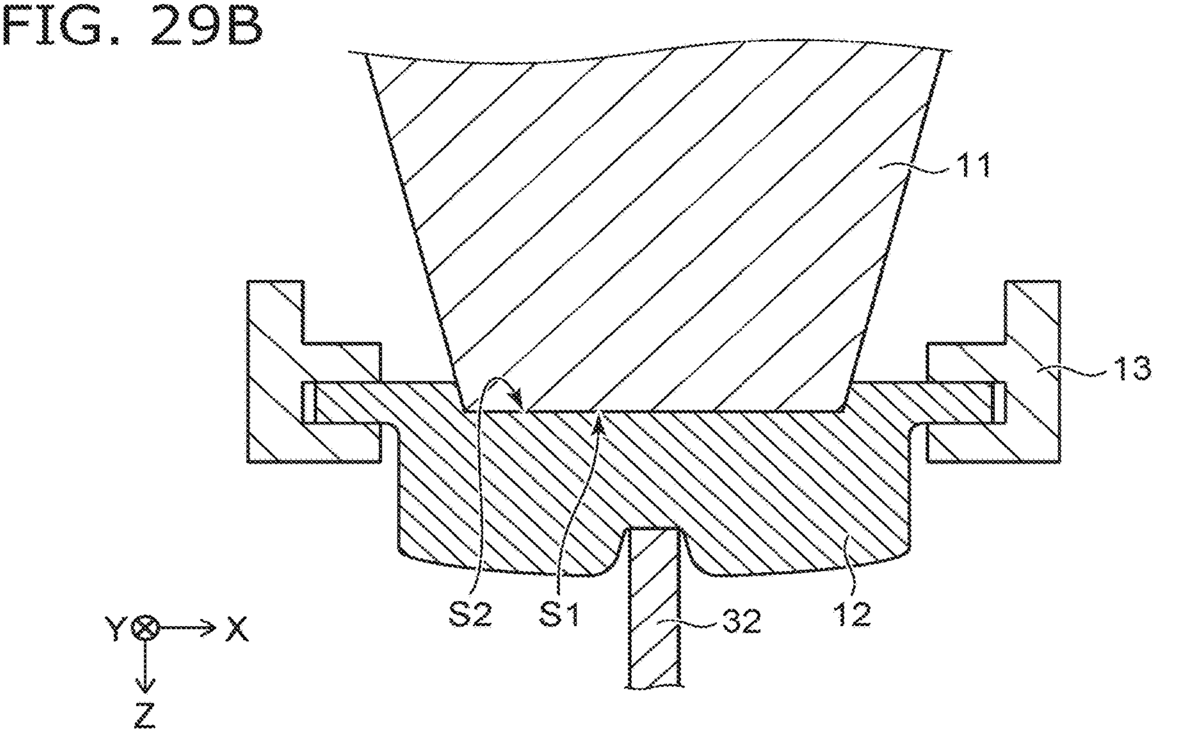

FIGS. 29A and 29B are cross-sectional views showing a detection device according to a modification of the embodiment.

In the detection device 10*a* according to the modification, the second propagating member 12 does not include a protrusion. Instead, the ejector unit 32 pushes the center of the second propagating member 12 upward toward the first propagating member 11 as shown in FIG. 29A when the second propagating member 12 is pressed toward the first propagating member 11. Accordingly, a portion of the second surface S2 protrudes toward the first propagating member 11. A state similar to when the second surface S2 includes a protrusion is obtained.

When the ejector unit 32 pushes the second propagating member 12 upward, the periphery of the second propagating member 12 is clamped by the fixture 13 in the Z-direction so that the second propagating member 12 is not lifted from the fixture 13.

The second propagating member 12 is pressed onto the first propagating member 11 in a state in which the ejector unit 32 pushes the second propagating member 12 upward. The portion of the second propagating member 12 that is pushed up contacts the first surface S1 of the first propagating member 11. When the second propagating member 12 is pushed further toward the first propagating member 11 in this state, the second surface S2 of the second propagating member 12 is closely adhered to the first surface S1 as shown in FIG. 29B.

According to the detection device 10*a* according to the modification, similarly to the detection device 10, the occurrence of the bubble B between the first surface S1 and the second surface S2 can be suppressed.

Figure 30:
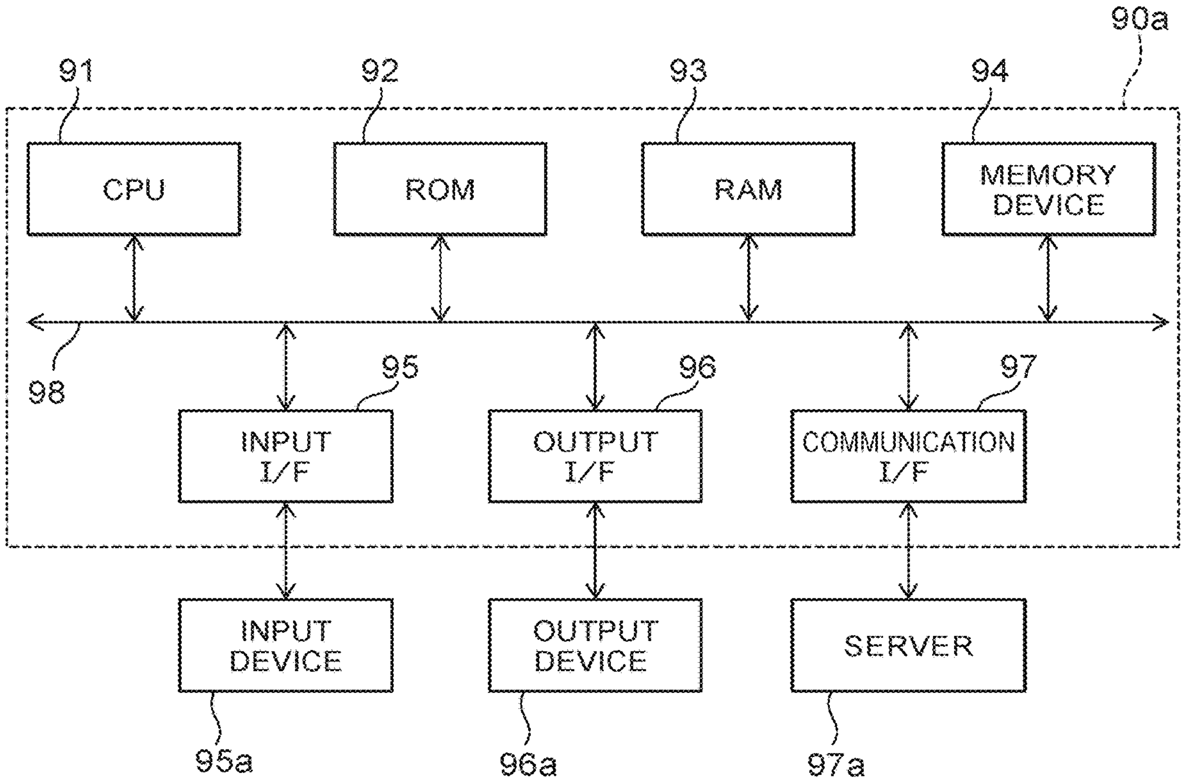
FIG. 30 is a schematic view illustrating a hardware configuration.

FIG. 30 is a schematic view illustrating a hardware configuration.

For example, a computer 90*a* shown in FIG. 30 can be used as the processing device 90. The computer 90*a* includes a CPU 91, ROM 92, RAM 93, a memory device 94, an input interface 95, an output interface 96, and a communication interface 97.

The ROM 92 stores programs that control the operations of the computer 90*a*. Programs that are necessary for causing the computer 90*a* to realize the processing described above are stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the memory device 94. When executing the programs, the CPU 91 executes various processing by controlling configurations via a system bus 98.

The memory device 94 stores data necessary for executing the programs and/or data obtained by executing the programs.

The input interface (I/F) 95 connects the processing device and an input device 95*a*. The input I/F 95 is, for example, a serial bus interface such as USB, etc. The CPU 91 can read various data from the input device 95*a* via the input I/F 95.

The output interface (I/F) 96 connects the processing device 90 and an output device 96*a*. The output I/F 96 is, for example, an image output interface such as Digital Visual Interface (DVI), High-Definition Multimedia Interface (HDMI (registered trademark)), etc. The CPU 91 can transmit data to the output device 96*a* via the output I/F 96 and can cause the output device 96*a* to display an image.

The communication interface (I/F) 97 connects the processing device 90 and a server 97*a* outside the processing device 90. The communication I/F 97 is, for example, a network card such as a LAN card, etc. The CPU 91 can read various data from the server 97*a* via the communication I/F 97.

The memory device 94 includes at least one selected from a hard disk drive (HDD) and a solid state drive (SSD). The input device 95*a* includes at least one selected from a mouse, a keyboard, a microphone (audio input), and a touchpad. The output device 96*a* includes at least one selected from a monitor and a projector. A device such as a touch panel that functions as both the input device 95*a* and the output device 96*a* may be used.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another non-transitory computer-readable storage medium.

For example, the information that is recorded in the recording medium can be read by the computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

The present invention may include the following embodiments.

Clause 1

A detection device, comprising:
- a detector transmitting an ultrasonic wave and detecting a reflected wave;
- a first propagating member mounted to the detector, the ultrasonic wave propagating through the first propagating member;
- a second propagating member including a second surface contacting a first surface of the first propagating member, the second surface including a protrusion, the second propagating member being softer than the first propagating member, the ultrasonic wave propagating through the second propagating member after propagating through the first propagating member; and
- a fixture pressing a periphery of the second propagating member toward the first propagating member.

Clause 2

The detection device according to clause 1, wherein
- a length of the second surface in a second direction perpendicular to a first direction is greater than a length of the first surface in the second direction, and
- the first direction is from the detector toward the first propagating member.

Clause 3

The detection device according to clause 2, wherein
- the second propagating member includes:
  - a first region pressed by the fixture; and
  - a second region surrounded with the first region, and
- the second region protrudes further in the first direction than the first region and contacts an object.

Clause 4

The detection device according to clause 3, wherein
- a length of the second region in the second direction is greater than the length of the first surface in the second direction.

Clause 5

The detection device according to any one of clauses 2 to 4, wherein
- a portion of the second propagating member contacts a portion of a surface of the first propagating member crossing the second direction.

Clause 6

The detection device according to any one of clauses 2 to 5, wherein
- the detector includes an element array,
- the element array includes a plurality of detection elements,
- each of the plurality of detection elements transmits the ultrasonic wave and detects the reflected wave, and
- the length of the first surface in the second direction is less than a length of the element array in the second direction.

Clause 7

The detection device according to any one of clauses 1 to 6, wherein
- the second surface includes a plurality of the protrusions and a plurality of recesses.

Clause 8

The detection device according to any one of clauses 1 to 7, wherein
- the second propagating member has a hole extending through the second propagating member along a first direction, and
- the first direction is from the detector toward the first propagating member.

Clause 9

The detection device according to any one of clauses 1 to 8, wherein
- a hardness of the second propagating member measured by an Asker durometer Type F is greater than 40 and less than 60.

Clause 10

A detection system, comprising:
- the detection device according to any one of clauses 1 to 9; and
- a processing device that inspects, based on intensity data, an object reflecting the ultrasonic wave,
- the intensity data being of an intensity of the reflected wave detected by the detector.

Clause 11

The system according to clause 10, wherein
- the object is a joined body including a weld portion, and
- the processing device inspects the weld portion.

Clause 12

A detection system, comprising:
- the detection device according to any one of clauses 1 to 9; and
- a manipulator,
- the detection device being located at a distal end of the manipulator.

According to the detection device, the detection system, or the second propagating member described above, the occurrence of bubbles between the first propagating member and the second propagating member can be suppressed, and the accuracy of the probing can be increased.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. A detection device, comprising:

a detector transmitting an ultrasonic wave and detecting a reflected wave;

a first propagating member mounted to the detector, the ultrasonic wave propagating through the first propagating member, the first propagating member having a first surface;

a second propagating member having a second surface that includes a protrusion configured to contact the first surface, the entirety of the protrusion being pressed, along a first direction, by the first propagating member when the second surface is in contact with the first surface, the first direction being from the first propagating member toward the second propagating member, the second propagating member being softer than the first propagating member, the ultrasonic wave propagating through the second propagating member after propagating through the first propagating member; and a fixture pressing a periphery of the second propagating member toward the first propagating member.

2. The detection device according to claim 1, wherein a length of the second surface in a second direction perpendicular to the first direction is greater than a length of the first surface in the second direction.

3. The detection device according to claim 2, wherein the second propagating member includes:

a first region pressed by the fixture; and a second region surrounded with the first region, and the second region protrudes further in the first direction than the first region and contacts an object.

4. The detection device according to claim 3, wherein a length of the second region in the second direction is greater than the length of the first surface in the second direction.

5. The detection device according to claim 2, wherein a portion of the second propagating member contacts a portion of a surface of the first propagating member crossing the second direction.

6. The detection device according to claim 2, wherein the detector includes an element array, the element array includes a plurality of detection elements, each of the plurality of detection elements transmits the ultrasonic wave and detects the reflected wave, and the length of the first surface in the second direction is less than a length of the element array in the second direction.

7. The detection device according to claim 1, wherein the second surface includes a plurality of the protrusions and a plurality of recesses.

8. The detection device according to claim 1, wherein the second propagating member has a hole extending through the second propagating member along the first direction.

9. The detection device according to claim 1, wherein a hardness of the second propagating member measured by an Asker durometer Type F is greater than 40 and less than 60.

10. A detection system, comprising:

the detection device according to claim 1; and a processing device that inspects, based on intensity data, an object reflecting the ultrasonic wave, the intensity data being of an intensity of the reflected wave detected by the detector.

11. The system according to claim 10, wherein the object is a joined body including a weld portion, and the processing device inspects the weld portion.

12. A detection system, comprising:

the detection device according to claim 1; and a manipulator, the detection device being located at a distal end of the manipulator.

13. The detection device according to claim 1, wherein the protrusion is spherical, circular conical, or pyramidal when the second surface is not in contact with the first surface of the first propagating member.

14. The detection device according to claim 1, wherein the second propagating member includes:

a first region pressed by the fixture; and a second region surrounded with the first region, the second region protruding further in the first direction than the first region to contact an object, the protrusion is aligned with the second region in the first direction.

15. The detection device according to claim 14, wherein a length of the second region in a second direction is greater than a length of the protrusion in the second direction, and the second direction is perpendicular to the first direction.

16. The detection device according to claim 15, wherein a length of the first surface in the second direction is greater than the length of the protrusion in the second direction.

17. The detection device according to claim 16, wherein the length of the second region in the second direction is greater than 0.5 times the length of the protrusion in the second direction.

18. The detection device according to claim 16, wherein the protrusion is spherical when the second surface is not in contact with the first surface of the first propagating member, and a length of the second region in a second direction is greater than 0.5 times a diameter of the protrusion in the second direction.

19. A detection device, comprising:

a detector transmitting an ultrasonic wave and detecting a reflected wave;

a first propagating member mounted to the detector, the ultrasonic wave propagating through the first propagating member;

a second propagating member, the second propagating member being softer than the first propagating member, the ultrasonic wave propagating through the second propagating member after propagating through the first propagating member; and a fixture including a pressing part that presses a periphery of the second propagating member toward the first propagating member, the first propagating member including a first surface crossing a first direction, the first direction being from the first propagating member toward the second propagating member, and a third surface oblique to the first surface, the second propagating member contacting the first and third surfaces, the second propagating member including a first region pressed by the pressing part, and a second region surrounded with the first region, a distance between the first surface and the pressing part in the first direction being less than a thickness of the first region in the first direction.

* * * * *